United States Patent
Kim

(10) Patent No.: US 12,181,934 B2
(45) Date of Patent: Dec. 31, 2024

(54) ELECTRONIC DEVICE COMPRISING HINGE ASSEMBLY

(71) Applicant: SAMSUNG ELECTRONICS CO., LTD., Suwon-si (KR)

(72) Inventor: Sungkwang Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 165 days.

(21) Appl. No.: 17/944,685

(22) Filed: Sep. 14, 2022

(65) Prior Publication Data
US 2023/0069146 A1    Mar. 2, 2023

Related U.S. Application Data

(63) Continuation of application No. PCT/KR2022/009637, filed on Jul. 5, 2022.

(30) Foreign Application Priority Data

Sep. 1, 2021 (KR) .................. 10-2021-0116255

(51) Int. Cl.
*G06F 1/16* (2006.01)
(52) U.S. Cl.
CPC .......... *G06F 1/1681* (2013.01); *G06F 1/1616* (2013.01)
(58) Field of Classification Search
CPC .... G06F 1/1681; G06F 1/1616; G06F 1/1618; G06F 1/1652; H04M 1/022
See application file for complete search history.

(56) References Cited

U.S. PATENT DOCUMENTS

| | | | | |
|---|---|---|---|---|
| 5,987,704 A | * | 11/1999 | Tang ..................... | G06F 1/1681 16/342 |
| 8,776,319 B1 | * | 7/2014 | Chang .................. | G06F 1/1681 16/303 |

(Continued)

FOREIGN PATENT DOCUMENTS

| CN | 103322030 | 9/2013 |
|---|---|---|
| CN | 105485157 | 4/2016 |

(Continued)

OTHER PUBLICATIONS

Search Report dated Oct. 6, 2022 issued in International Patent Application No. PCT/KR2022/009637.
(Continued)

*Primary Examiner* — Sagar Shrestha
(74) *Attorney, Agent, or Firm* — NIXON & VANDERHYE P.C.

(57) ABSTRACT

Disclosed is an electronic device including a hinge assembly. The electronic device may include: a display including a first area and a second area; a first housing positioned in the first area; a second housing positioned in the second area; a hinge assembly including a hinge foldably connecting the first housing and the second housing based on a folding axis, and configured to operate between a folding position at which the first area and the second area face each other and an unfolding position at which the first area and the second area form a substantially same plane; and a stopper configured to connect to the hinge assembly and to limit a movement of the first housing and the second housing based on the first housing and the second housing being at a rest angle. The stopper may include a first stopper positioned in the first housing; and a second stopper positioned in the second housing, and the first stopper and the second stopper (Continued)

may contact each other at the rest angle and the movement of the first housing and the second housing may be limited.

20 Claims, 13 Drawing Sheets

(56) References Cited

U.S. PATENT DOCUMENTS

| | | | | |
|---|---|---|---|---|
| 9,915,086 | B2* | 3/2018 | Kato | E05D 11/087 |
| 10,747,271 | B2* | 8/2020 | Lin | G06F 1/1681 |
| 10,845,850 | B1* | 11/2020 | Kang | E05D 3/122 |
| 11,720,153 | B2* | 8/2023 | Hsu | G06F 1/1681 |
| | | | | 16/250 |
| 11,956,378 | B2* | 4/2024 | Kang | G06F 1/1616 |
| 11,983,047 | B2* | 5/2024 | Park | G06F 1/1652 |
| 2013/0014346 | A1 | 1/2013 | Ahn et al. | |
| 2013/0152342 | A1* | 6/2013 | Ahn | F16C 11/04 |
| | | | | 16/354 |
| 2018/0067520 | A1* | 3/2018 | Määttä | G06F 1/1681 |
| 2019/0391618 | A1 | 12/2019 | Hsu | |
| 2020/0103935 | A1* | 4/2020 | Hsu | G06F 1/1681 |
| 2021/0397223 | A1* | 12/2021 | Lee | G06F 1/1684 |
| 2022/0206543 | A1* | 6/2022 | Kim | G06F 1/1641 |
| 2022/0303371 | A1* | 9/2022 | Liao | H04M 1/0216 |

FOREIGN PATENT DOCUMENTS

| | | |
|---|---|---|
| CN | 110056291 | 7/2019 |
| CN | 111684691 | 9/2020 |
| CN | 111885236 | 11/2020 |
| KR | 10-0983105 | 9/2010 |
| KR | 10-1875855 | 7/2018 |
| KR | 10-1941584 | 1/2019 |
| KR | 10-2020-0047253 | 5/2020 |
| KR | 10-2020-0073686 | 6/2020 |
| KR | 10-2020-0094763 | 8/2020 |
| KR | 10-2169912 | 10/2020 |
| KR | 10-2186343 | 12/2020 |
| KR | 10-2021-0054954 | 5/2021 |

OTHER PUBLICATIONS

Extended European Search Report for EP Application No. 22864844.0 dated Sep. 4, 2024, 12 pages.

\* cited by examiner

ELECTRONIC DEVICE COMPRISING HINGE ASSEMBLY

CROSS-REFERENCE TO RELATED APPLICATIONS

This application is a continuation of International Application No. PCT/KR2022/009637 designating the United States, filed on Jul. 5, 2022, in the Korean Intellectual Property Receiving Office and claiming priority to Korean Patent Application No. 10-2021-0116255, filed on Sep. 1, 2021, in the Korean Intellectual Property Office, the disclosures of which are incorporated by reference herein in their entireties.

BACKGROUND

1. Field

The disclosure relates to a hinge assembly and an electronic device including the same.

2. Description of Related Art

An electronic device tends to be transformed into various shapes according to needs of a user. For example, the electronic device may have an easy-to-carry and deformable structure such that a display with a large screen may be available when in use. For example, a foldable electronic device in which a partial area (e.g., a display area) of the electronic device may be folded and unfolded, if necessary, may be provided.

SUMMARY

Embodiments of the disclosure provide a hinge assembly equipped with a stopper capable of more accurately fastening a folding position and an unfolding position of a foldable electronic device and an electronic device including the same.

Embodiments of the disclosure provide a hinge assembly capable of simplifying an assembly structure of a stopper and an electronic device including the same.

Embodiments of the disclosure provide a hinge assembly capable of verifying a defect of a stopper before assembly to a finished product and an electronic device including the same.

Embodiments of the disclosure provide a hinge assembly capable of preventing/reducing folding and unfolding defects due to an assembly tolerance and a dimensional deviation occurring while a plurality of parts is being assembled and folding and unfolding defects due to deformation during use and an electronic device including the same.

Embodiments of the disclosure provide a hinge assembly capable of preventing/reducing an unfolding defect phenomenon that is poorly unfolded or a folding defect phenomenon that is poorly closed or excessively closed due to lifting or sagging and an electronic device including the same.

An electronic device according to various example embodiments may include: a display including a first area and a second area; a first housing positioned in the first area; a second housing positioned in the second area; a hinge assembly including a hinge configured to foldably connect the first housing and the second housing based on a folding axis, and to operate between a folding position at which the first area and the second area face each other and an unfolding position at which the first area and the second area form a substantially same plane; and a stopper configured to connect to the hinge assembly and to limit a movement of the first housing and the second housing based on the first housing and the second housing being at a rest angle. The stopper may include a first stopper positioned in the first housing; and a second stopper positioned in the second housing, the first stopper and the second member may contact each other at the rest angle, and the movement of the first housing and the second housing may be limited.

A hinge assembly according to various example embodiments may include: a rotate bracket; a first gear shaft rotatably inserted into and coupled to a first side of the rotate bracket and into which a first gear is inserted and configured to rotate; a second gear shaft rotatably inserted into and coupled to a second side of the rotate bracket, into which a second gear is inserted and configured to rotate, and spaced apart at a same distance as the first gear shaft from a folding axis; a first idle gear shaft rotatably inserted into and coupled to the first side of the rotate bracket and into which a first idle gear contacting the first gear is inserted and configured to rotate; a second idle gear shaft rotatably inserted into and coupled to the second side of the rotate bracket, into which a second idle gear contacting the second gear is inserted and configured to rotate, and spaced apart at a same distance as the first idle gear shaft from the folding axis; a first stopper inserted into and configured rotate with the first idle gear shaft; and a second stopper inserted into and configured to rotate with the second idle gear shaft. The first idle gear and the second idle gear may be configured to rotate in opposite directions in contact with each other, the first stopper may include a first body, a first hole formed at the center of the first body and into which the first idle gear shaft is inserted, and a first protrusion protruding from the first body, and the second stopper may include a second body, a second hole formed at the center of the second body and into which the second idle gear shaft inserted, and a second protrusion protruding from the second body.

An electronic device according to various example embodiments may include: a display including a first area and a second area; a first housing positioned in the first area; a second housing positioned in the second area; and a hinge assembly including a hinge configured to foldably connect the first housing and the second housing based on a folding axis, and to operate between a folding position at which the first area and the second area face each other and an unfolding position at which the first area and the second area form the substantially same plane. The hinge assembly may include: a rotate bracket having a first side connected to the first housing and a second side connected to the second housing; a first gear shaft rotatably inserted into and coupled to the first side of the rotate bracket and into which a first gear inserted and configured to rotate; a second gear shaft rotatably inserted into and coupled to the second side of the rotate bracket, into which a second gear is inserted and configured to rotate, and spaced apart at a same distance as the first gear shaft from the folding axis; a first idle gear shaft rotatably inserted into and coupled to the first side of the rotate bracket and into which a first idle gear connected to the first gear is inserted and configured to rotate; a second idle gear shaft rotatably inserted into and coupled to the second side of the rotate bracket, into which a second idle gear connected to the second gear is inserted and configured to rotate, and spaced apart at a same distance as the first idle gear shaft from the folding axis; a first stopper inserted into and configured to rotate with the first idle gear shaft; and a second stopper inserted into and configured to rotate with the second idle gear shaft. The first idle gear and the second idle gear may rotate in opposite directions in contact with each other, the first stopper may include a first body, a first hole formed at the center of the first body and into which the first idle gear shaft is inserted, and a first protrusion protruding from the first body, the second stopper may include a second body, a second hole formed at the center of the second body and into which the second idle gear shaft is inserted, and a second protrusion protruding from the second body, a sum of a distance from the center of the first hole to the outside of the first body and a distance from the center of the second hole to the outside of the second body may be less than a distance between the first hole and the second hole, and a sum of a distance from the center of the first hole to an end of the first protruding element and a distance from the center of the second hole to an end of the second protruding element may be greater than the distance between the first hole and the second hole.

According to various example embodiments, it is possible to more accurately fasten a folding position and an unfolding position of a foldable electronic device.

According to various example embodiments, it is possible to simplify an assembly of a hinge assembly and to verify a defect of the hinge assembly before the assembly is completed.

According to various example embodiments, it is possible to prevent and/or reduce folding and unfolding defects due to an assembly tolerance, a dimensional deviation, or a deformation during use.

According to various example embodiments, it is possible to prevent and/or reduce an unfolding defect phenomenon that is poorly unfolded or a folding defect phenomenon that is poorly closed or excessively closed due to lifting or sagging in a foldable electronic device.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
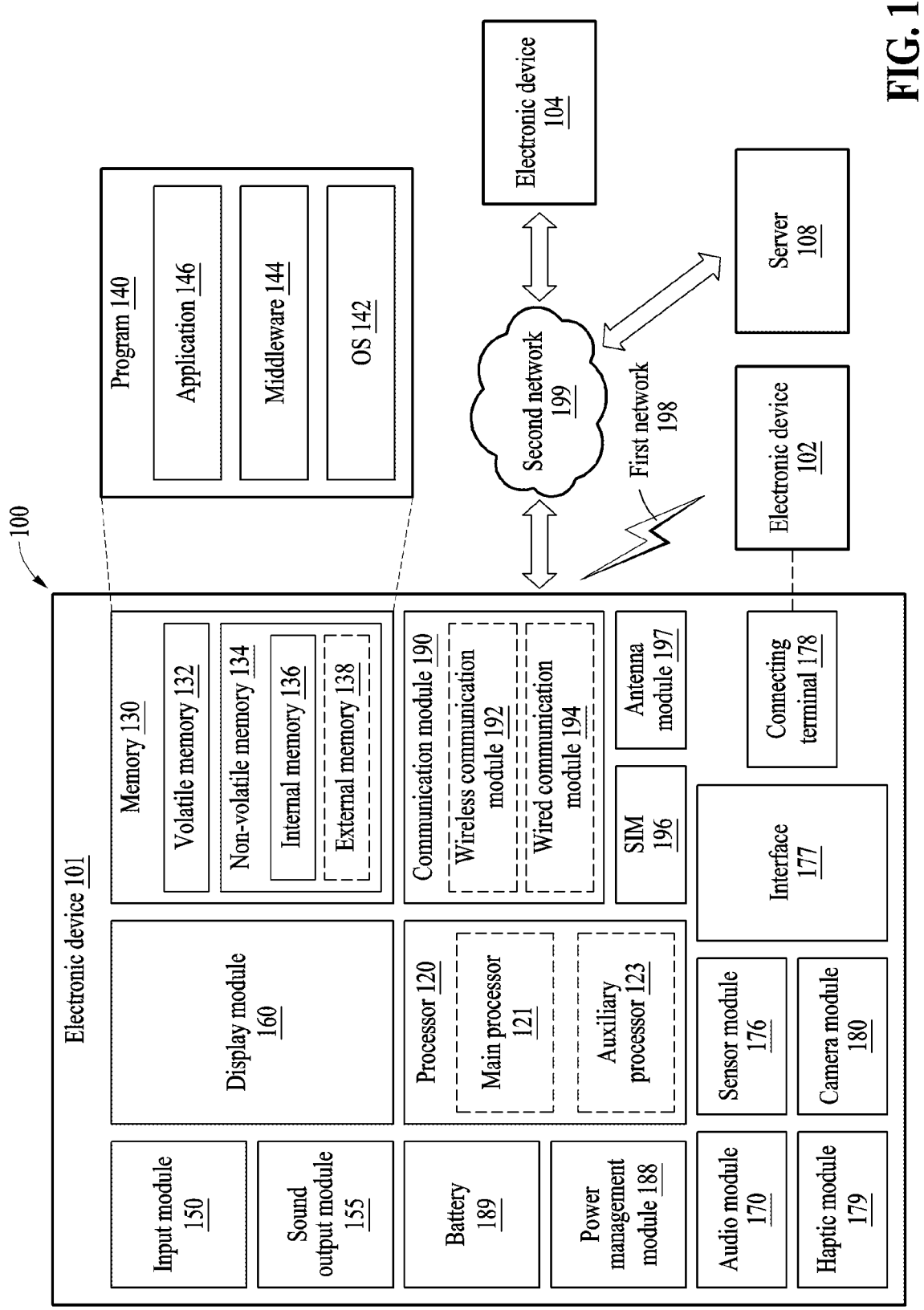
FIG. 1 is a block diagram illustrating an example electronic device in a network environment according to various embodiments.

Hereinafter, various example embodiments will be described in greater detail with reference to the accompanying drawings. When describing the example embodiments with reference to the accompanying drawings, like reference numerals refer to like elements and a repeated description related thereto may not be provided.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In various embodiments, at least one (e.g., the connecting terminal 178) of the above components may be omitted from the electronic device 101, or one or more other components may be added in the electronic device 101. In various embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled to the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled to the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled to," "coupled to," "connected with," or "connected to" another element (e.g., a second element), the element may be coupled to the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
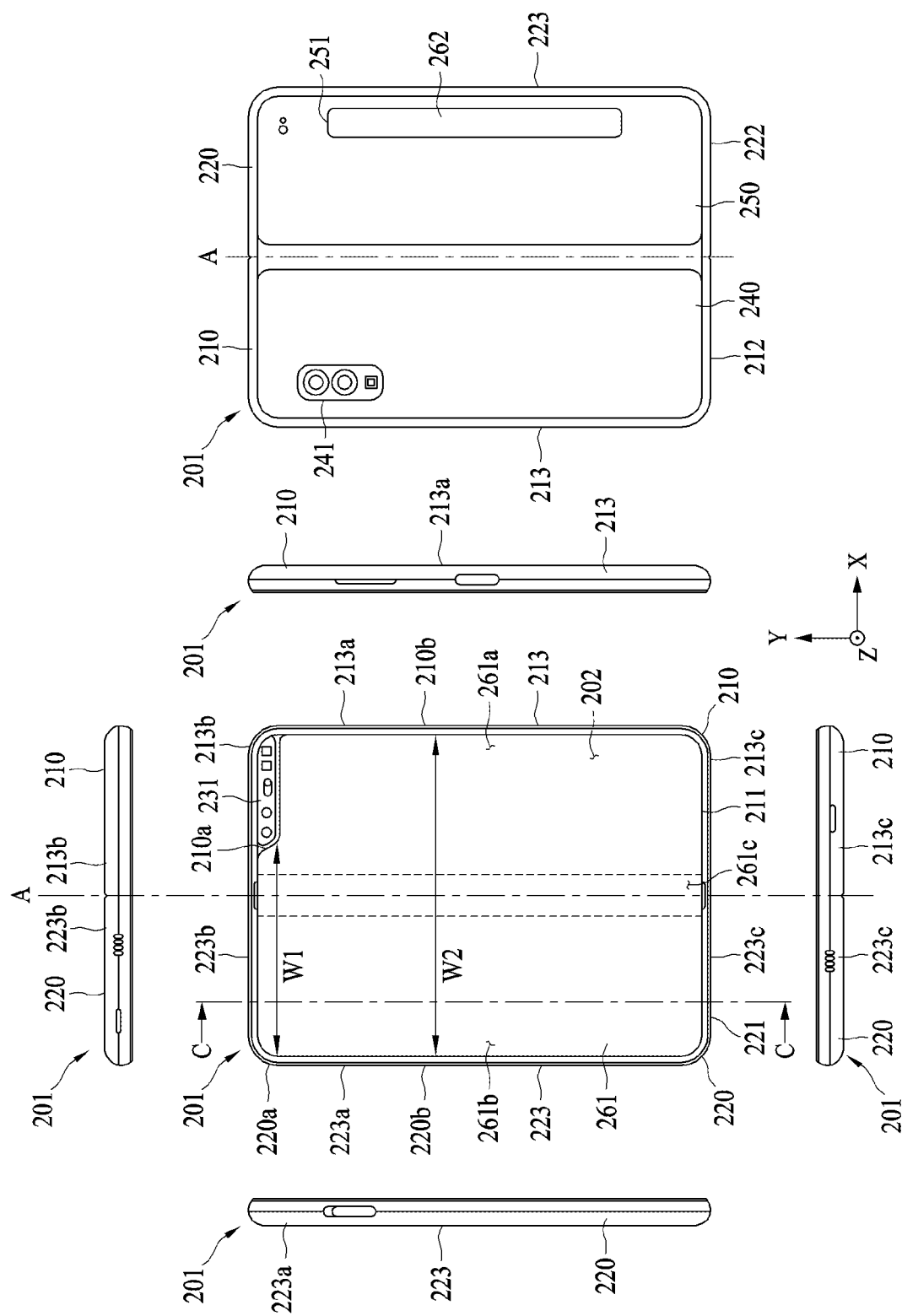
FIG. 2A is a diagram illustrating an example foldable electronic device in an unfolded state according to various embodiments.
Figure 2B:
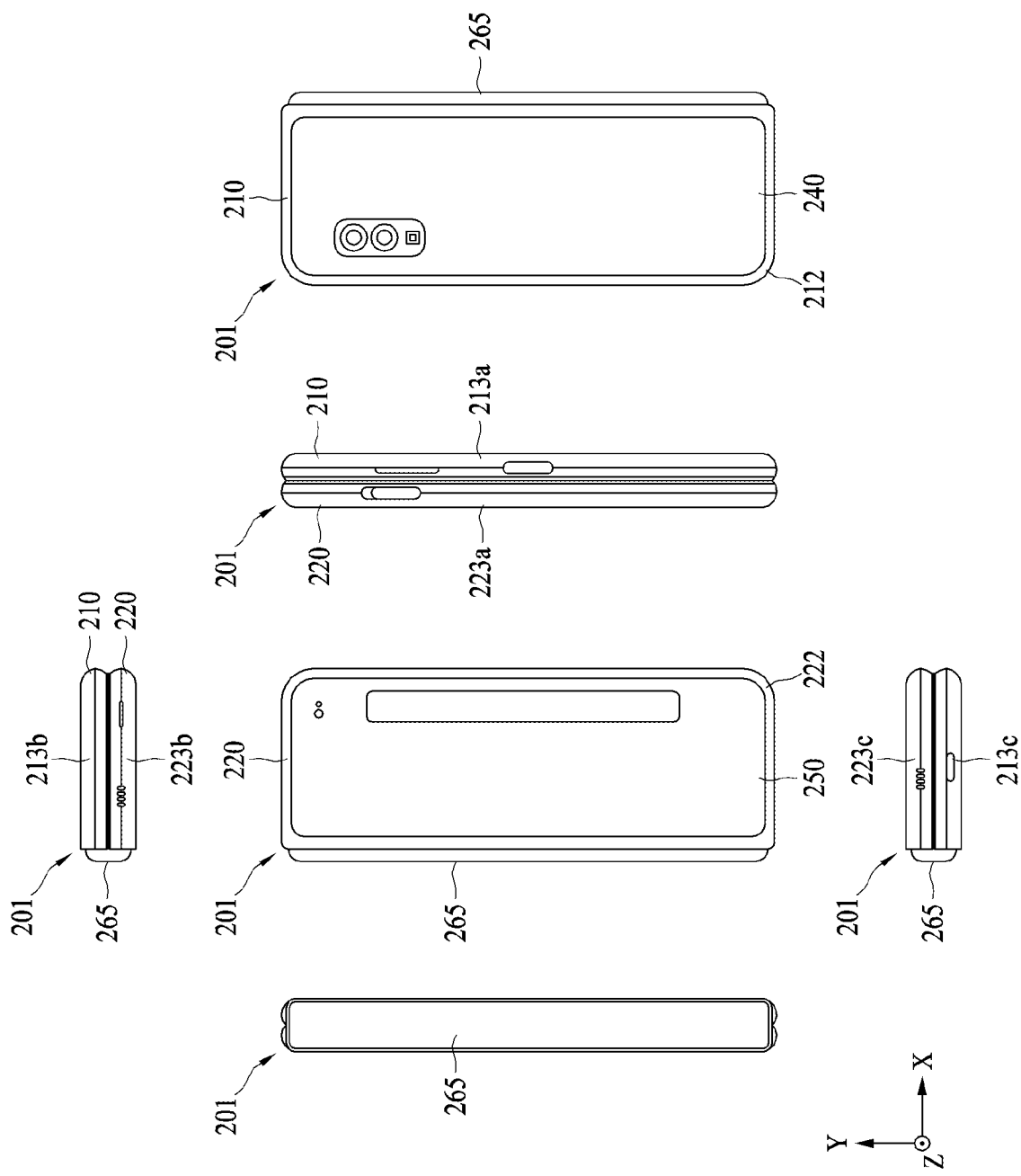
FIG. 2B is a diagram illustrating an example foldable electronic device in a folded state according to various embodiments.

Referring to FIGS. 2A and 2B, an example foldable electronic device 201 according to various embodiments may include a single pair of housings 210 and 220 configured to rotatably couple through a hinge structure to be folded against each other, a hinge cover 265 configured to cover a foldable portion of the single pair of housings 210 and 220, and a display 261 (e.g., a flexible display or a foldable display) provided in a space formed by the single pair of housings 210 and 220. Herein, a surface on which the display 261 is provided may be specified as a front surface of the foldable electronic device 201 and an opposite surface of the front surface may be specified as a rear surface of the foldable electronic device 201. Also, a surface that surrounds a space between the front surface and the rear surface may be specified as a side surface of the foldable electronic device 201.

In an example embodiment, the single pair of housings 210 and 220 may include the first housing 210 including a sensor area 231, the second housing 220, a first rear cover 240, and a second rear cover 250. The single pair of housings 210 and 220 of the electronic device 201 are not limited to a shape or a combination and/or coupling of parts of FIGS. 2A and 2B and may be implemented in another shape or combination and/or coupling of other parts.

In an example embodiment, the first housing 210 and the second housing 220 may be provided on both sides based on a folding axis A and may be substantially symmetrically provided with respect to the folding axis A. In an example embodiment, an angle or a distance formed by the first housing 210 and the second housing 220 may vary depending on whether the electronic device 201 is in an unfolding state, a folding state, or an intermediate state. In an example embodiment, dissimilar to the second housing 220, the first housing 210 includes the sensor area 231 in which various sensor modules (e.g., the sensor module 176 of FIG. 1) are provided. In other areas, the first housing 210 and the second housing 220 may have a symmetrical shape. In some example embodiments, the sensor area 231 may be provided in at least a partial area of the second housing 220. In some example embodiments, the sensor area 231 may be replaced with at least a partial area of the second housing 220. For example, the sensor area 231 may include a camera hole area, a sensor hole area, an under display camera (UDC) area and/or a under display sensor (UDS) area. In an example embodiment, the electronic device 201 may operate in an in-folding manner and/or an out-folding manner since the first housing 210 rotates with the range of 0 to 360 degrees with respect to the second housing 220 through the hinge structure. In various example embodiments, when the electronic device 201 is viewed from above, the hinge structure may be formed in a vertical direction or may be formed in a horizontal direction. In various example embodiments, a plurality of hinge structures may be provided. For example, the plurality of hinge structures may be arranged in the same direction. As another example, some hinge structures among the plurality of hinge structures may be arranged in different directions and folded.

In an example embodiment, the first housing 210 may be connected to the hinge structure in an unfolding state of the electronic device 201. The first housing 210 may include a first surface 211 provided to face the front surface of the electronic device 201, a second surface 212 configured to face an opposite direction of the first surface 211, and a first side portion 213 configured to surround at least a portion of a space between the first surface 211 and the second surface 212. The first side portion 213 may include a first side surface 213a provided substantially parallel to the folding axis A, a second side surface 213b configured to extend from one end of the first side surface 213a in a direction substantially perpendicular to the folding axis A and a third side surface 213c configured to extend from another end of the first side surface 213a in a direction substantially perpendicular to the folding axis A and substantially parallel to the second side surface 213b. The second housing 220 may be connected to the hinge structure in the unfolding state of the electronic device 201. The second housing 220 may include a third surface 221 provided to face the front surface of the electronic device 201, a fourth surface 222 provided to face the opposite surface of the third surface 221, and a second side portion 223 configured to surround at least a portion of a space between the third surface 221 and the fourth surface 222. The second side portion 223 may include a fourth side surface 223a provided substantially parallel to the folding axis A, a fifth side surface 223b configured to extend from one end of the fourth side surface 223a in a direction substantially perpendicular to the folding axis A, and a sixth side surface 223c configured to extend from another end of the fourth side surface 223a in a direction substantially perpendicular to the folding axis A and substantially parallel to the fifth side surface 223b. The first surface 211 and the third surface 221 may face each other when the electronic device 201 is in a folding state.

In an example embodiment, the electronic device 201 may include a recess-shaped accommodation portion 202 configured to accommodate the display 261 through structural coupling of the first housing 210 and the second housing 220. The accommodation portion 202 may have the substantially same size as that of the display 261. In an example embodiment, due to the sensor area 231, the accommodation portion 202 may have two or more different widths in a direction perpendicular to the folding axis A. For example, the accommodation portion 202 may have a first width W1 between a first portion 210a formed at an edge of the sensor area 231 in the first housing 210 and a second portion 220a parallel to the folding axis A in the second housing 220 and a second width W2 between a third portion 220a parallel to the folding axis A in the second housing 220 and a second width W2 between a third portion 210b non-overlapping the sensor area 231 and parallel to the folding axis A in the first housing 210 and a fourth portion 220b in the second housing 220. Here, the second width W2 may be greater than the first width W1. That is, the accommodation portion 202 may be formed to have the first width W1 from the first portion 210a of the first housing 210 to the second portion 220a of the second housing 220 having a symmetrical shape with respect to each other and the second width W2 from the third portion 210b of the first housing 210 to the fourth portion 220b of the second housing 220. The first portion 210a and the third portion 210b of the first housing 210 may be formed at different distances from the folding axis A. Meanwhile, the width of the accommodation portion 202 may not be limited to the illustrated example. For example, the accommodation portion 202 may have three or more different widths depending on a shape of the sensor area 231 or an asymmetrical shape of the first housing 210 and the second housing 220.

In an example embodiment, at least a portion of the first housing 210 and the second housing 220 may be formed of a metallic material or a nonmetallic material having a rigidity suitable for supporting the display 261.

In an example embodiment, the sensor area 231 may be formed adjacent to one corner of the first housing 210. Here, an arrangement, a shape, or a size of the sensor area 231 may not be limited to the illustrated example. In some example embodiments, the sensor area 231 may be formed in another corner or a predetermined area of an upper corner and a lower corner of the first housing 210. In some example embodiments, the sensor area 231 may be provided in at least a partial area of the second housing 220. In some example embodiments, the sensor area 231 may be formed to extend between the first housing 210 and the second housing 220.

In an example embodiment, the electronic device 201 may include at least one component for performing various functions that are displayed on the front surface of the electronic device 201 through the sensor area 231 or at least one opening formed in the sensor area 231. For example, the component may include at least one of a front camera module, a receiver, a proximity sensor, an illuminance sensor, an iris recognition sensor, an ultrasonic sensor, and an indicator.

In an example embodiment, the first rear cover 240 may be provided on the second surface 212 of the first housing 210 and may have substantially rectangular edges. At least a portion of the edges of the first rear cover 240 may be surrounded by the first housing 210. The second rear cover 250 may be provided on the fourth surface 222 of the second housing 220 and may have substantially rectangular edges. At least a portion of the edges of the second rear cover 250 may be surrounded by the second housing 220.

In an example embodiment, the first rear cover 240 and the second rear cover 250 may have a substantially symmetrical shape based on the folding axis A. In another example embodiment, the first rear cover 240 and the second rear cover 250 may have different shapes. In still another example embodiment, the first housing 210 and the first rear cover 240 may be integrally formed, and the second housing 220 and the second rear cover 250 may be integrally formed.

In an example embodiment, the first housing 210, the second housing 220, the first rear cover 240, and the second rear cover 250 may provide a space in which various components (e.g., a printed circuit board, the antenna module 197 of FIG. 1, the sensor module 176 of FIG. 1, or the battery 189 of FIG. 1) of the electronic device 201 through an interconnected structure. In an example embodiment, at least one component may be visually exposed on the rear surface of the electronic device 201. For example, at least one component may be visually exposed through a first rear area 241 of the first rear cover 240. Here, the component may include a proximity sensor, a rear camera module, and/or a flash. In an example embodiment, at least a portion of a sub-display 262 may be visually exposed through a second rear area 251 of the second rear cover 250. In an example embodiment, the electronic device 201 may include a sound output module (e.g., the sound output module 155 of FIG. 1) that is provided through at least a partial area of the second rear cover 250. In an example embodiment, the display 261 may be provided to the accommodation portion 202 formed by the single pair of housings 210 and 220. For example, the display 261 may be provided to occupy the substantially most surface of the front surface of the electronic device 201. The front surface of the electronic device 201 may include an area in which the display 261 is provided, a partial area (e.g., an edge area) of the first housing 210 adjacent to the display 261, and a partial area (e.g., an edge area) of the second housing 220. The rear surface of the electronic device 201 may include the first rear cover 240, a partial area (e.g., an edge area) of the first housing 210 adjacent to the first rear cover 240, the second rear cover 250, and a partial area (e.g., an edge area) of the second housing 220 adjacent to the second rear cover 250. In an example embodiment, the display 261 may be a display of which at least a partial area is deformable to a planar surface or a curved surface. In an example embodiment, the display 261 may include a folding area 261c, a first area 261a of a first side (e.g., right) based on the folding area 261c, and a second area 261b of a second side (e.g., left) based on the folding area 261c. The first area 261a may be positioned on the first surface 211 of the first housing 210 and the second area 261b may be positioned on the third surface 221 of the second housing 210. Here, area division of the display 261 is provided as an example only and the display 261 may be divided into a plurality of areas according to a structure or a function of the display 261. For example, referring to FIG. 2A, the display 261 may be divided into areas by the folding area 261c that extends parallel to a Y axis or the folding axis A. Also, the display 261 may be divided into areas based on another area (e.g., a folding area that extends parallel to an X axis) or another folding axis (e.g., a folding axis parallel to the X axis). The above area division of the display 261 refers to only a physical division by the single pair of housings 210 and 220 and the hinge structure. Practically, the display 261 may display a substantially single screen through the single pair of housings 210 and 220 and the hinge structure. In an example embodiment, although the first area 261a may include a notch area formed along the sensor area 231, the first area 261a and the second area 261b may have a substantially symmetrical shape in other areas. In still another example embodiment, the first area 261a and the second area 261b may have a substantially symmetrical shape based on the folding area 261c.

In an example embodiment, the hinge cover 265 may be provided between the first housing 210 and the second housing 220 and may be configured to cover the hinge structure. The hinge cover 265 may be hidden or externally exposed by at least a portion of the first housing 210 and the second housing 220 according to an operating state of the electronic device 201. For example, referring to FIG. 2A, when the electronic device 201 is in an unfolding state, the hinge cover 265 may be hidden by the first housing 210 and the second housing 220 and may not be exposed to the outside. Referring to FIG. 2B, when the electronic device 201 is in a folding state, the hinge cover 265 may be exposed to the outside between the first housing 210 and the second housing 220. Meanwhile, when the electronic device 201 is in an intermediate state in which the first housing 210 and the second housing 220 form an angle, at least a portion of the hinge cover 265 may be exposed to the outside between the first housing 210 and the second housing 220. Here, an area in which the hinge cover 265 is exposed to the outside may be less than an exposure area of the hinge cover 265 in a case in which the electronic device 201 is in the folding state. In an example embodiment, the hinge cover 265 may have a curved surface.

Describing an operation of the electronic device 201 according to an example embodiment, when the electronic device 201 is in an unfolding state (e.g., the state of the electronic device 201 of FIG. 2A), the first housing 210 and the second housing 220 may mutually form a first angle (e.g., about 180 degrees) and the first area 261a and the second area 261b of the display 261 may be provided in the substantially same direction. The folding area 261c of the display 261 may be on the substantially same plane as the first area 261a and the second area 261b. In another example embodiment, when the electronic device 201 is in the unfolding state, the first housing 210 may rotate at a second angle (e.g., about 360 degrees) relative to the second housing 220 and the first housing 210 and the second housing 220 may be reversely folded such that the second surface 212 and the fourth surface 222 may face each other. Meanwhile, when the electronic device 201 is in a folding state (e.g., the state of the electronic device 201 of FIG. 2B), the first housing 210 and the second housing 220 may face each other. The first housing 210 and the second housing 220 may form an angle of about 0 degrees to about 10 degrees and the first area 261a and the second area 261b of the display 261 may face each other. At least a portion of the folding area 261c of the display 261 may be transformed to the curved surface. Also, when the electronic device 201 is in an intermediate state, the first housing 210 and the second housing 220 may mutually form a specific angle. The angle (e.g., a third angle, about 90 degrees) formed by the first area 261a and the second area 261b of the display 261 may be greater than an angle when the electronic device 201 is in the folding state and may be less than an angle when the electronic device 201 is in the unfolding state. At least a portion of the folding area 261c of the display 261 may be transformed to the curved surface. Here, a curvature of the curved surface of the folding area 261c may be less than a curvature of the curved surface of the folding area 261c when the electronic device 201 is in the folding state.

Here, various example embodiments of an electronic device described herein may apply to an electronic device of various form factors without being limited to form factors of the electronic device 201 described with reference to FIGS. 2A and 2B.

Figure 3A:
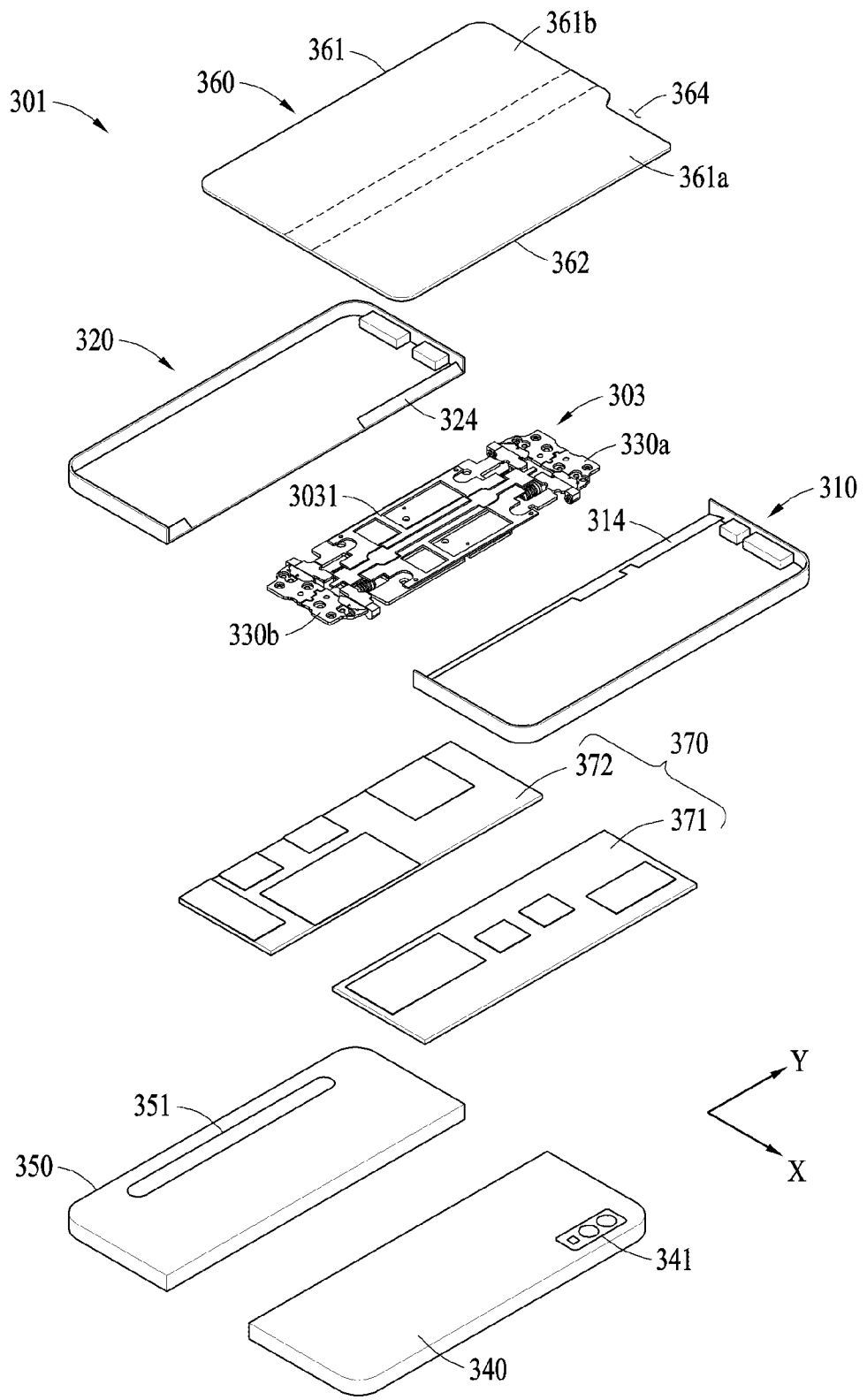
FIG. 3A is an exploded perspective view of an electronic device according to various embodiments.
Figure 3B:
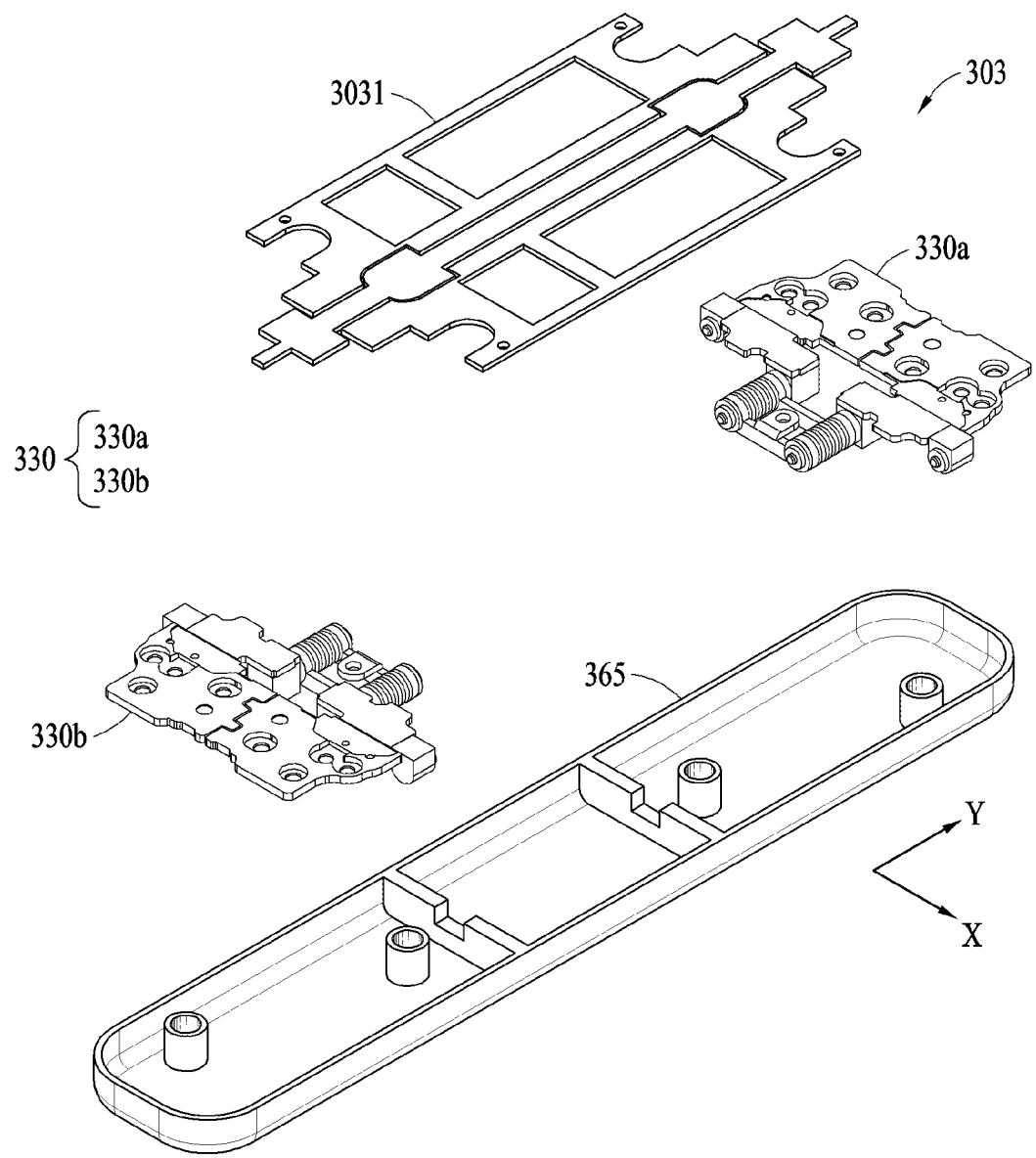
FIG. 3B is an exploded perspective view of a hinge structure according to various embodiments.

Referring to FIGS. 3A and 3B, an example foldable electronic device 301 according to various embodiments may include a display module 360 (e.g., the display module 160 in FIG. 1), a hinge structure 303, a substrate 370, a first housing 310 (e.g., the first housing 210 in FIG. 2A), a second housing 320 (e.g., the second housing 220 in FIG. 2A), a first rear cover 340 (e.g., the first rear cover 240 in FIG. 2A) including a first rear area 341 (e.g., the first rear area 241 in FIG. 2A), and a second rear cover 350 (e.g., the second rear cover 250 in FIG. 2A) including a second rear area 351 (e.g., the second rear area 251 in FIG. 2A).

The display module 360 may include a display 361 (e.g., the display 261 in FIG. 2A) and at least one layer or plate 362 to which the display 361 is mounted. In an example embodiment, the plate 362 may be provided between the display 361 and a hinge structure 303. The display 361 may be provided on at least a portion of one surface (e.g., a top surface) of the plate 362. The plate 362 may be formed in a shape corresponding to the display 361. For example, a partial area of the plate 362 may be formed in a shape corresponding to a notch area 364 of the display 361.

The hinge structure 303 may include a hinge plate 3031, a hinge assembly 330 provided at both longitudinal ends of the hinge plate 3031, and a hinge cover 365 configured to cover at least a portion of the hinge assembly 330 when the hinge assembly 330 is viewed from the outside. For example, the hinge structure 303 may be provided between the plate 362 and the substrate 370.

In an example embodiment, the hinge assembly 330 may include a first hinge assembly 330a provided to one side of the hinge plate 3031 and a second hinge assembly 330b provided to another side of the hinge plate 3031. For example, the first hinge assembly 330a and the second hinge assembly 330b may be mutually symmetrically provided based on an axis (e.g., an X axis that passes the center of the hinge plate 3031) that is perpendicular to a folding axis (e.g., the folding axis A of FIG. 2A) and passes through the center of the hinge plate 3031.

The substrate 370 may include a first substrate 371 provide to a side of a first bracket 331 and a second substrate 372 provided to a side of a second bracket 332. The first substrate 371 and the second substrate 372 may be provided inside a space formed by the hinge structure 303, the first housing 310, the second housing 320, the first rear cover 340, and the second rear cover 350. Parts for implementing various functions of the electronic device 301 may be mounted to the first substrate 371 and the second substrate 372.

The first housing 310 and the second housing 320 may be assembled to each other to be coupled to both sides of the hinge structure 303 in a state in which the display module 360 is coupled to the hinge structure 303. The first housing 310 and the second housing 320 may slide from both sides of the hinge structure 303 and thereby couple to the hinge structure 303.

In an example embodiment, the first housing 310 may include a first rotation support surface 314, and the second housing 320 may include a second rotation support surface 324 corresponding to the first rotation support surface 314. The first rotation support surface 314 and the second rotation support surface 324 may include a curved surface corresponding to a curved surface included in the hinge cover 365.

In an example embodiment, when the electronic device 301 is in an unfolding state (e.g., the state of the electronic device 201 of FIG. 2A), the first rotation support surface 314 and the second rotation support surface 324 may cover the hinge cover 365 such that the hinge cover 365 may not be exposed to the rear surface of the electronic device 301 or may be minimally exposed. Also, when the electronic device 301 is in a folding state (e.g., the state of the electronic device 201 of FIG. 2B), the first rotation support surface 314 and the second rotation support surface 324 may rotate along the curved surface included in the hinge cover 365 such that the hinge cover 365 may be maximally exposed to the rear surface of the electronic device 301.

Figure 4A:
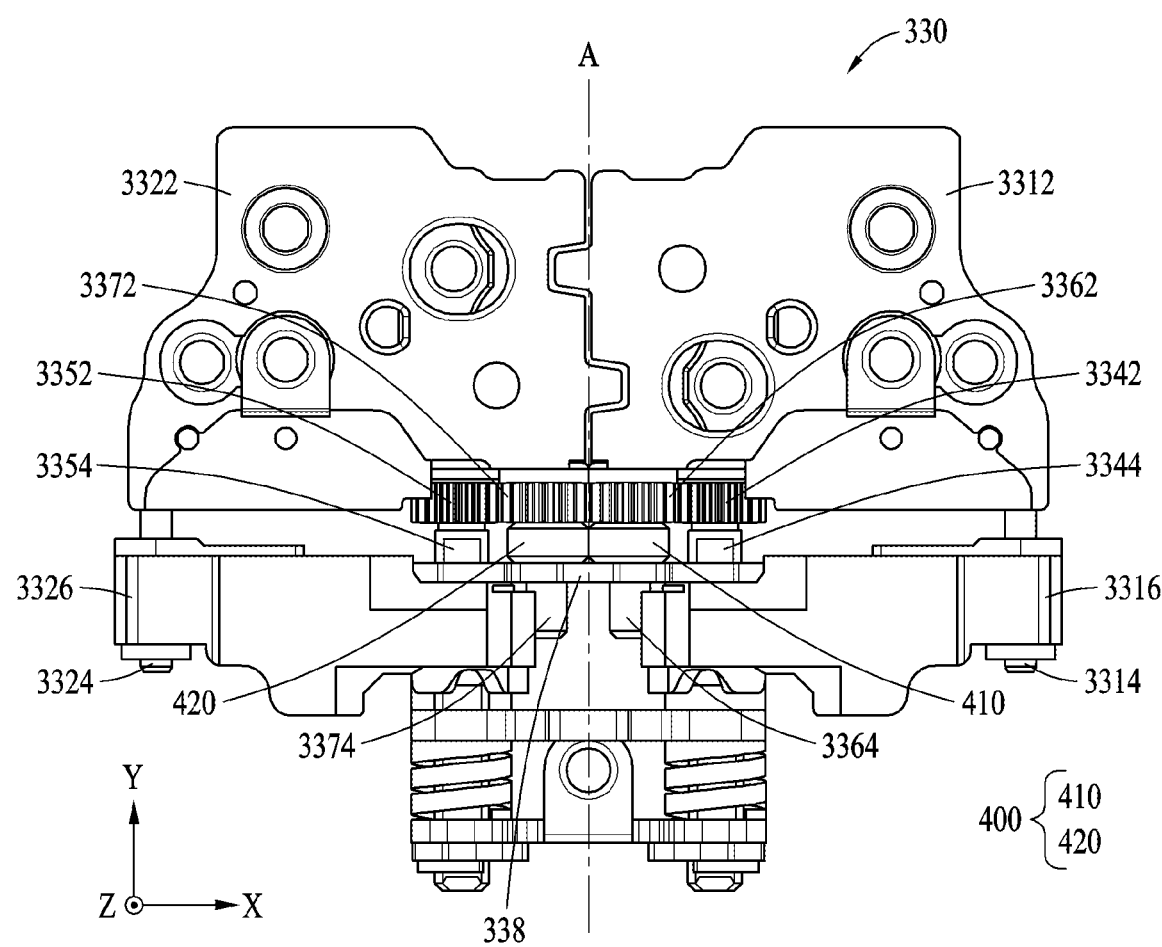
FIG. 4A is a diagram illustrating a hinge assembly according to various embodiments.
Figure 4B:
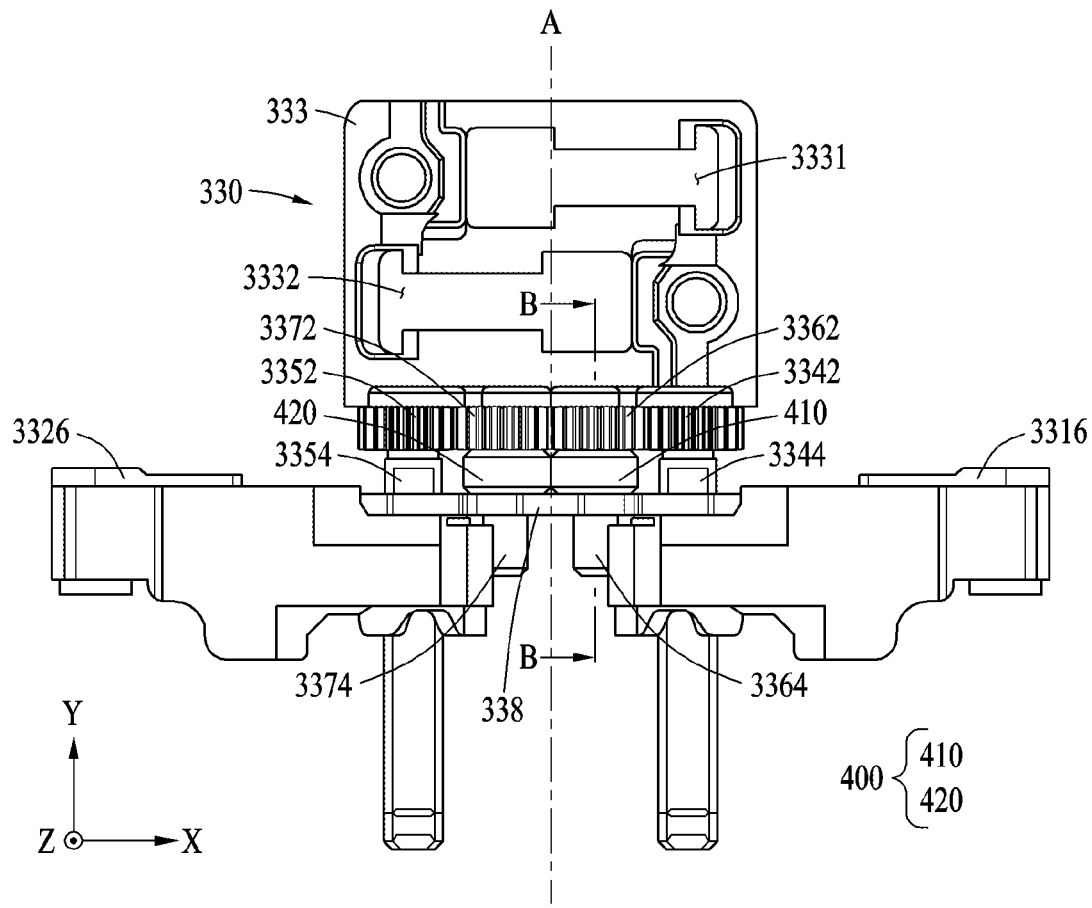
FIG. 4B is a diagram illustrating a portion of a hinge assembly according to various embodiments.
Figure 4C:
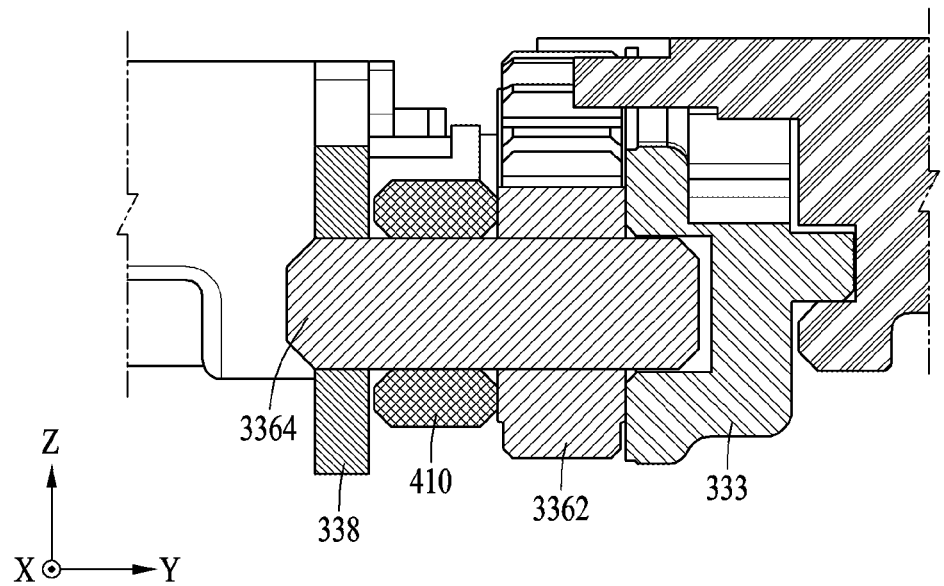
FIG. 4C is a cross-sectional view illustrating a portion of a hinge assembly taken along a line B-B of FIG. 4B according to various embodiments.

FIG. 4A is a diagram illustrating a portion of the hinge assembly 330 according to various embodiments, FIG. 4B is a diagram in which a first rotator 3312 and a second rotator 3322 are excluded from the hinge assembly 330 according to various embodiments of FIG. 4A according to various embodiments, and FIG. 4C is a cross-sectional view of the hinge assembly 330 taken along a line B-B of FIG. 4B according to various embodiments.

Referring to 4A and 4B, the hinge assembly 330 according to various example embodiments may include a rotate bracket 333, a first gear shaft 3344 configured to rotatably insert into and couple to a first side 3331 of the rotate bracket 333, a second gear shaft 3354 configured to rotatably insert into and couple to a second side 3332 of the rotate bracket 333, a first rotator 3312 configured to rotatably couple to the first side 3331 of the rotate bracket 333, a second rotator 3322 configured to rotatably couple to the second side 3332 of the rotate bracket 333, a first pin 3314 of which one end is connected to the first rotator 3312, a second pin 3324 of which one end is connected to the second rotator 3322, a first arm 3316 of which one end is connected to another end of the first pin 3314 and of which another end is bound to the first gear shaft 3344, a second arm 3326 of which one end is connected to another end of the second pin 3324 and of which another end is bound to the second gear shaft 3354, a first gear 3342 configured to insert into and rotate with the first gear shaft 3344, a second gear 3352 configured to insert into and rotate with the second gear shaft 3354, a first idle gear shaft 3364 into which a first idle gear 3362 connected to the first gear 3342 inserts and rotates, a second idle gear shaft 3374 into which a second idle gear 3372 connected to the second gear 3352 inserts and rotates, a first stopper member 410 configured to insert into and rotate with the first idle gear shaft 3364, and a second stopper member 420 configured to insert into and rotate with the second idle gear shaft 3374.

In an example embodiment, a first area of a display (e.g., a first area 361a of the display 361 of FIG. 3A) may be seated on one surface (e.g., a surface that faces +Z direction in FIG. 4A) of the first rotator 3312, and a first rear cover (e.g., the first rear cover 340 of FIG. 3A) may be seated on another surface (e.g., a surface that faces −Z direction in FIG. 4A) of the first rotator 3312. A second area of the display (a second area 361b of the display 361 of FIG. 3A) may be seated on one surface (a surface that faces +Z direction in FIG. 4A) of the second rotator 3322, and a second rear cover (e.g., the second rear cover 350 of FIG. 3A) may be seated on another surface (e.g., a surface that faces −Z direction in FIG. 4A) of the second rotator 3322. For example, the first area and the second area of the display may be fastened to the first rotator 3312 and the second rotator 3322 by bond or tape adhesion, and the first rear cover and the second rear cover may be connected to the first rotator 3312 and the second rotator 3322 by screws, respectively. In an example embodiment, at least a portion of edges of the first rotator 3312 may be surrounded by a first housing (e.g., the first housing 310 of FIG. 3A) and at least a portion of the second rotator 3322 may be surrounded by a second housing (e.g., the second housing 320 of FIG. 3A).

In an example embodiment, each of the first gear shaft 3344 and the second gear shaft 3354 is spaced apart at a first distance based on a folding axis A, and each of the first idle gear shaft 3364 and the second idle gear shaft 3374 is spaced apart at a second distance based on the folding axis A. The first distance may be greater than the second distance. The first gear 3342 and the second gear 3352 may be symmetrical based on the folding axis A, the first idle gear 3362 and the second idle gear 3372 may be symmetrical based on the folding axis A, and the first gear 3342 first idle gear 3362 may be in contact, the second gear 3352 and the second idle gear 3372 may be in contact, and the first idle gear 3362 and the second idle gear 3372 may be in contact, such that adjacent gears may rotate in opposite directions.

In an example embodiment, when an external force is generated to rotate the first rotator 3312 and the second rotator 3322 based on the folding axis A, a rotational motion of the first rotator 3312 and the second rotator 3322 may be delivered to the first arm 3316 and the second arm 3326 by way of the first pin 3314 and the second pin 3324 respectively connected to the first rotator 3312 and the second rotator 3322. By rotation of the first arm 3316 and the second arm 3326, the first gear shaft 3344 and the second gear shaft 3354 respectively bound to the first arm 3316 and the second arm 3326 may rotate and the rotation of the first gear shaft 3344 and the second gear shaft 3354 may cause the first gear 3342 and the second gear 3352 to rotate. The first idle gear 3362 and the first gear 3342 may rotate in opposite directions in contact with each other, and the second idle gear 3372 and the second gear 3352 may rotate in opposite directions in contact with each other. The first idle gear 3362 and the second idle gear 3372 may rotate in opposite directions in contact with each other, and an amount of rotation of the first gear shaft 3344 and the second gear shaft 3354 may be adjusted to be the same. Through this, the first housing connected to the first rotator 3312 and the second housing connected to the second rotator 3322 may rotate with the same amount of rotation.

In an example embodiment, a stopper 400 may include a first stopper member 410 positioned on the side of the first housing (e.g., the first housing 310 of FIG. 3A) and a second stopper member 420 positioned on the side of the second housing (e.g., the second housing 320 of FIG. 3A). When the first housing and the second housing are at a rest angle, the first stopper member 410 and the second stopper member 420 are in contact with each other and a movement and/or rotation of the first housing and the second housing may be limited. For example, the first stopper member 410 may rotate based on a first axis of rotation (e.g., an axis of the first gear shaft 3344 or an axis of the first idle gear shaft 3364), and the second stopper member 420 may rotate based on a second axis of rotation (e.g., an axis of the second gear shaft 3354 or an axis of the second idle gear shaft 3374) spaced at the same distance as the first axis of rotation from the folding axis A. For example, the first stopper member 410 and the second stopper member 420 may have a non-circular cross section mutually symmetrical relative to a folding surface (e.g., a surface through which the folding axis A and ±Z axis pass in FIG. 4A) that passes the folding axis A.

In an example embodiment, a limit bracket 338 may be coupled to an end of the first idle gear shaft 3364 and an end of the second idle gear shaft 3374 to constrain the first idle gear shaft 3364 and the second idle gear shaft 3374 and, through this, may prevent and/or reduce the first idle gear shaft 3364 and the second idle gear shaft 3374 from being widened due to the external force. The first stopper member 410 may be positioned between the first idle gear 3362 and the limit bracket 338, and the second stopper member 420 may be positioned between the second idle gear 3372 and the limit bracket 338.

In an example embodiment, it is possible to verify a defect of the hinge assembly 330 even before the entire assembly of the hinge assembly 330 is completed. For example, referring to FIG. 4B, when the first gear shaft 3344, the second gear shaft 3354, the first idle gear shaft 3364, and the second idle gear shaft 3374 rotatably insert into the rotate bracket 333, the first arm 3316 and the first gear 3342 are bound to the first gear shaft 3344, the second arm 3326 and the second gear 3352 are bound to the second gear shaft 3354, the first idle gear 3362 and the first stopper member 410 are bound to the first idle gear shaft 3364, and the second idle gear 3372 and the second stopper member 420 are bound to the second idle gear shaft 3374, it is possible to determine whether the first arm 3316 and the second arm 3326 are positioned at an accurate unfolding position and folding position and also, it is possible to verify a defect of the hinge assembly 330 even in a module unit.

Referring to FIG. 4C, at least a portion (e.g., an end of the first idle gear shaft 3364 that faces +Y axis in FIG. 4C) of the first idle gear shaft 3364 may rotatably insert into the rotate bracket 333 and the first idle gear 3362 and the first stopper member 410 may couple to a remaining portion of the first idle gear shaft 3364. Here, each of the first idle gear 3362 and the first stopper member 410 is press-fitted and coupled to the first idle gear shaft 3364, and the first idle gear 3362 and the first stopper member 410 may rotate with the first idle gear shaft 3364. Likewise, at least a portion of the second idle gear shaft 3374 may rotatably insert into the rotate bracket 333, and the second idle gear 3372 and the second stopper member 420 may couple to a remaining portion of the second idle gear shaft 3374. Here, the second idle gear 3372 and the second stopper member 420 may be press-fitted and coupled to the second idle gear shaft 3374 and may rotate together.

Figure 5A:
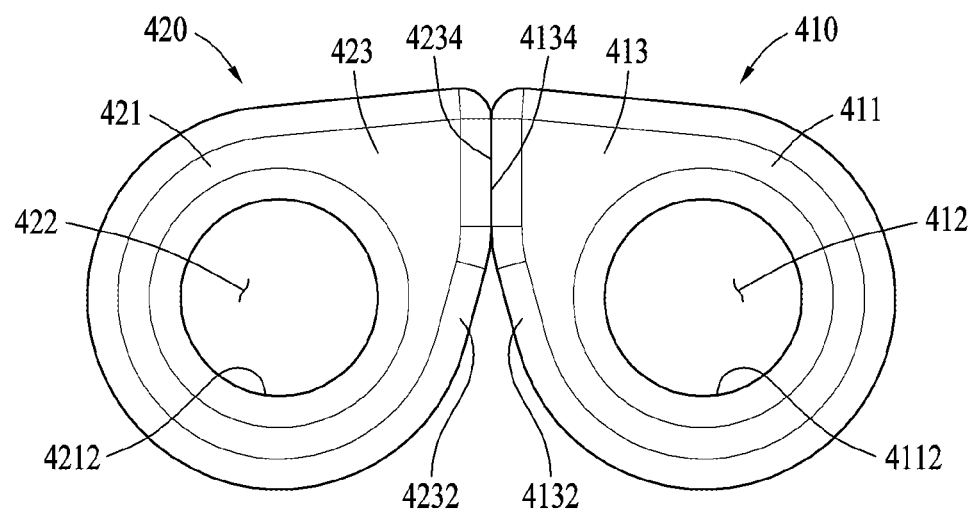
FIG. 5A is a diagram illustrating a stopper according to various embodiments.
Figure 5B:
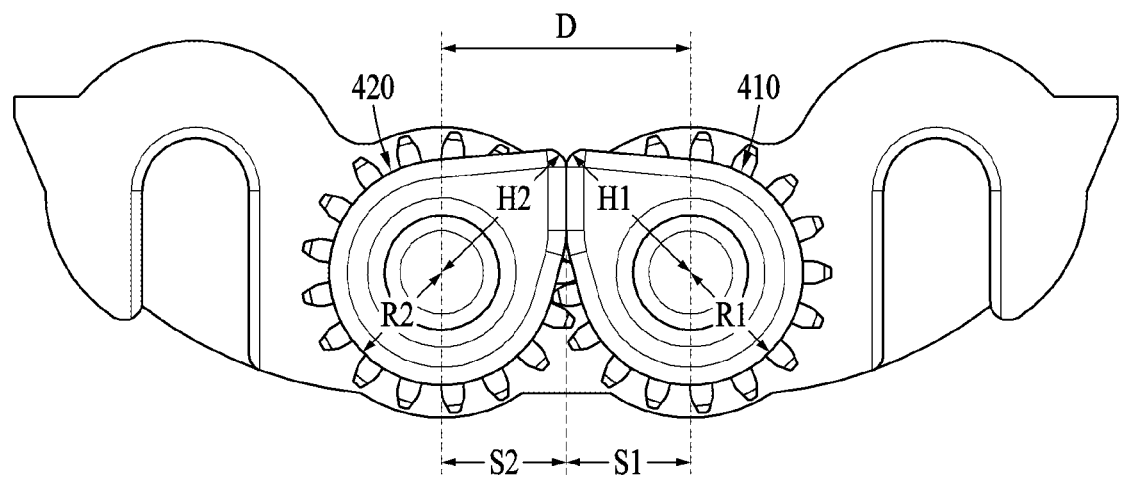
FIG. 5B is a diagram illustrating a dimension of a stopper according to various embodiments.

Referring to FIGS. 5A and 5B, the first stopper member 410 according to various embodiments may include a first body 411, a first hole 412 formed at the center of the first body 411, and a first protruding element 413 configured to protrude from the first body 411. For example, the first body 411 may be in a cylindrical shape, and the first hole 412 may be configured as a through hole that passes through the first body 411 and into which the first idle gear shaft 3364 may insert. Likewise, the second stopper member 420 may have a shape symmetrical to the first stopper member 410 based on the folding surface. The second stopper member 420 may include a second body 421, a second hole 422 formed at the center of the second body 421, and a second protruding element 423 configured to protrude from the second body 421. For example, the second body 421 may be in a cylindrical shape and the second hole 422 may be configured as a through hole that passes through the second body 421 and into which the second idle gear shaft 3374 may insert.

In an example embodiment, the first protruding element 413 may include a first curved section 4132 configured to extend from the outside of the first body 411 and a first planar section 4134 formed from the first curved section 4132 to an end of the first protruding element 413. Likewise, the second protruding element 423 may include a second curved section 4232 configured to extend from the outside of the second body 421 and a second planar section 4234 formed from the second curved section 4232 to an end of the second protruding element 423. When the first housing (e.g., the first housing 310 of FIG. 3A) and the second housing (e.g., the second housing 320 of FIG. 3A) are at a rest angle, the first planar section 4134 and the second planar section 4234 may be in contact with the folding surface through which a folding axis (e.g., the folding axis A of FIG. 4A) passes. For example, when the first housing and the second housing are at a folding position, the first planar section 4134 and the second planar section 4234 may be provided to be in contact with the folding surface and when the first housing and the second housing are at an unfolding position, the rest angle may be maintained through other parts (e.g., a support force of the rotator (3312, 3322) and the rotate bracket 333 in FIGS. 4A and 4B). As another example, when the first housing and the second housing are at an unfolding position, the first planar section 4134 and the second planar section 4234 may be provided to be in contact with the folding surface.

In an example embodiment, the first stopper member 410 may include a first press-fitting protrusion 4112 configured to protrude inward of the first hole 412 for press-fitting and coupling to the first idle gear shaft 3364. The second stopper member 420 may include a second press-fitting protrusion 4212 configured to protrude inward of the second hole 422 for press-fitting and coupling to the second idle gear shaft 3374. The first press-fitting protrusion 4112 may have a protrusion size that allows press-fitting and coupling through forced fitting of the first stopper member 410 and first idle gear shaft 3364. Likewise, the second press-fitting protrusion 4212 may have a protrusion size that allows press-fitting and coupling through forced fitting of the second stopper member 420 and the second idle gear shaft 3374.

In an example embodiment, a sum (R1+R2) of a distance R1 from the center of the first hole 412 of the first stopper member 410 to the outside of the first body 411 and a distance R2 from the center of the second hole 422 of the second stopper member 420 to the outside of the second body 421 may be less than a distance D between the first hole 412 and the second hole 422. A sum (H1+H2) of a distance H1 from the center of the first hole 412 of the first stopper member 410 to the end of the first protruding element 413 and a distance H2 from the center of the second hole 422 of the second stopper member 420 to the end of the second protruding element 423 may be greater than the distance D between the first hole 412 and the second hole 422.

In an example embodiment, a sum (S1+S2) of a perpendicular distance S1 from the center of the first hole 412 of the first stopper member 410 to the first planar section 4134 of the first body 411 and a perpendicular distance (S2) from the center of the second hole 422 of the second stopper member 420 to the second planar section 4234 may be substantially equal to the distance D between the first hole 412 and the second hole 422. Through the aforementioned dimensions of the first stopper member 410 and the second stopper member 420, the first stopper member 410 and the second stopper member 420 may be in contact with each other at the unfolding position or at the folding position, which may prevent and/or reduce the first stopper member 410 and the second stopper member 420 from excessively rotating beyond a set range.

The first stopper member 410 and the second stopper member 420 of the stopper 400 according to an example embodiment have advantages in that assembly to the hinge assembly 330 is relatively simple and it is easy to manage the unfolding position and the folding position of the hinge assembly 330 by managing dimensions of the first stopper member 410 and the second stopper member 420. For example, in the case of adjusting or managing the unfolding position or the folding position of the hinge assembly 300 through other parts (e.g., through a support force of the rotator (3312, 3322) and the rotate bracket 333 in FIGS. 4A and 4B), an unexpected deviation may occur due to accumulation of tolerance occurring while a plurality of parts is assembled. On the contrary, in the stopper 400 according to an example embodiment, only a tolerance of a distance between the first stopper member 410 and the second stopper member 420 simply needs to be managed and thus, management of relatively accurate unfolding position and folding position may be performed.

Figure 6A:
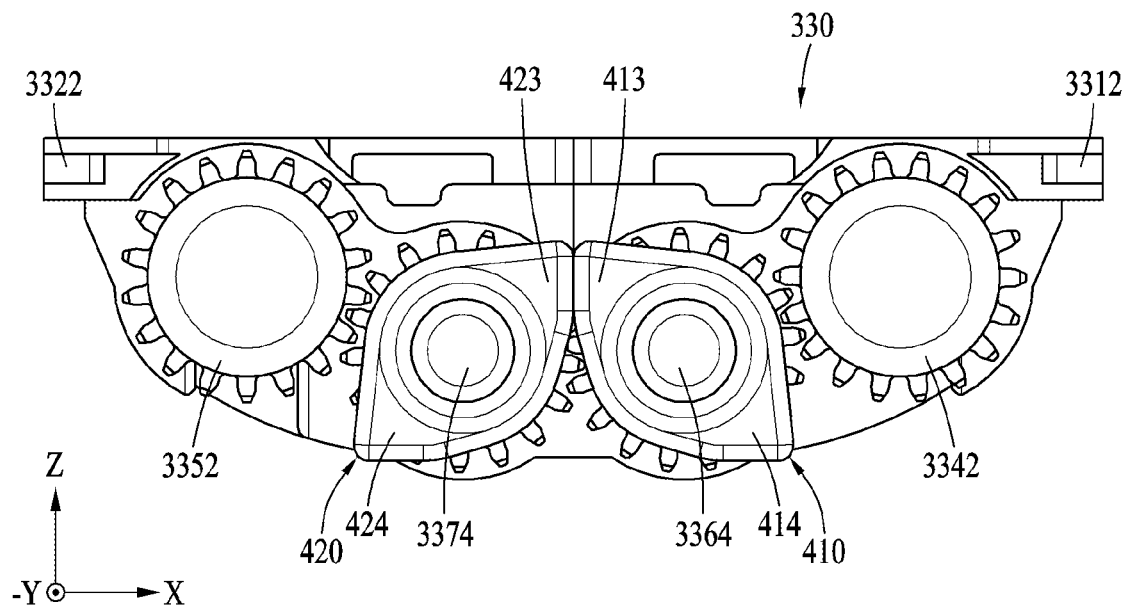
FIG. 6A is a diagram illustrating a hinge assembly in an unfolded state according to various embodiments.
Figure 6B:
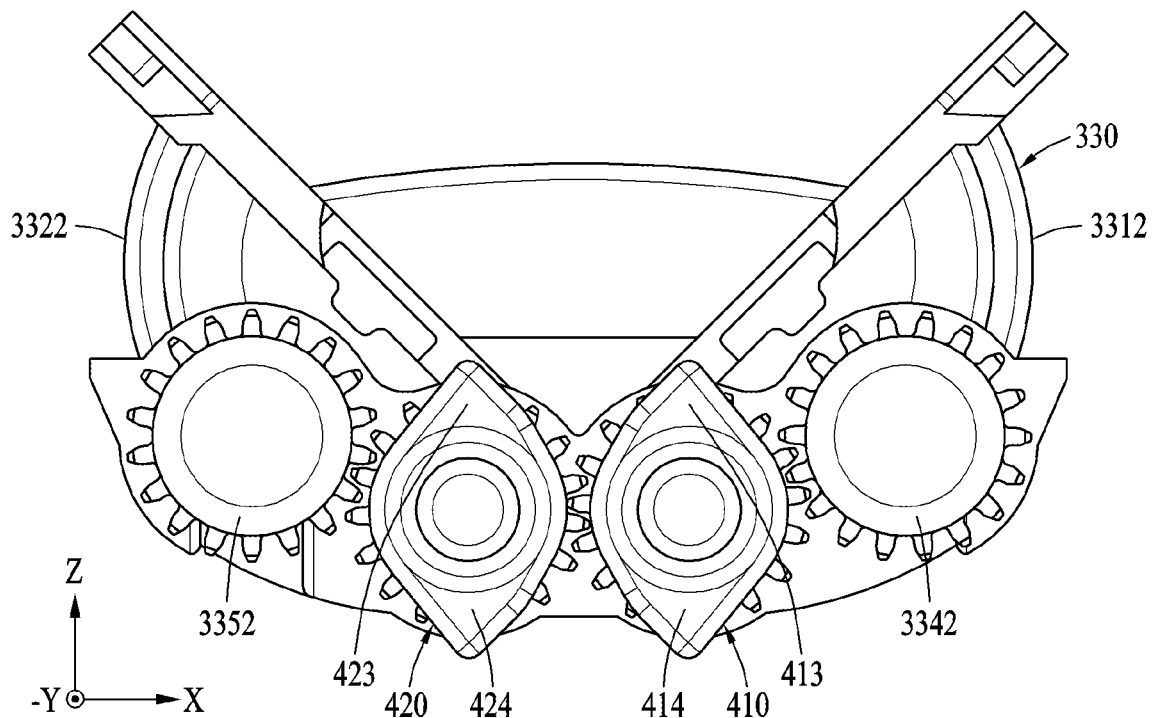
FIG. 6B is a diagram illustrating a hinge assembly in an intermediate state according to various embodiments.
Figure 6C:
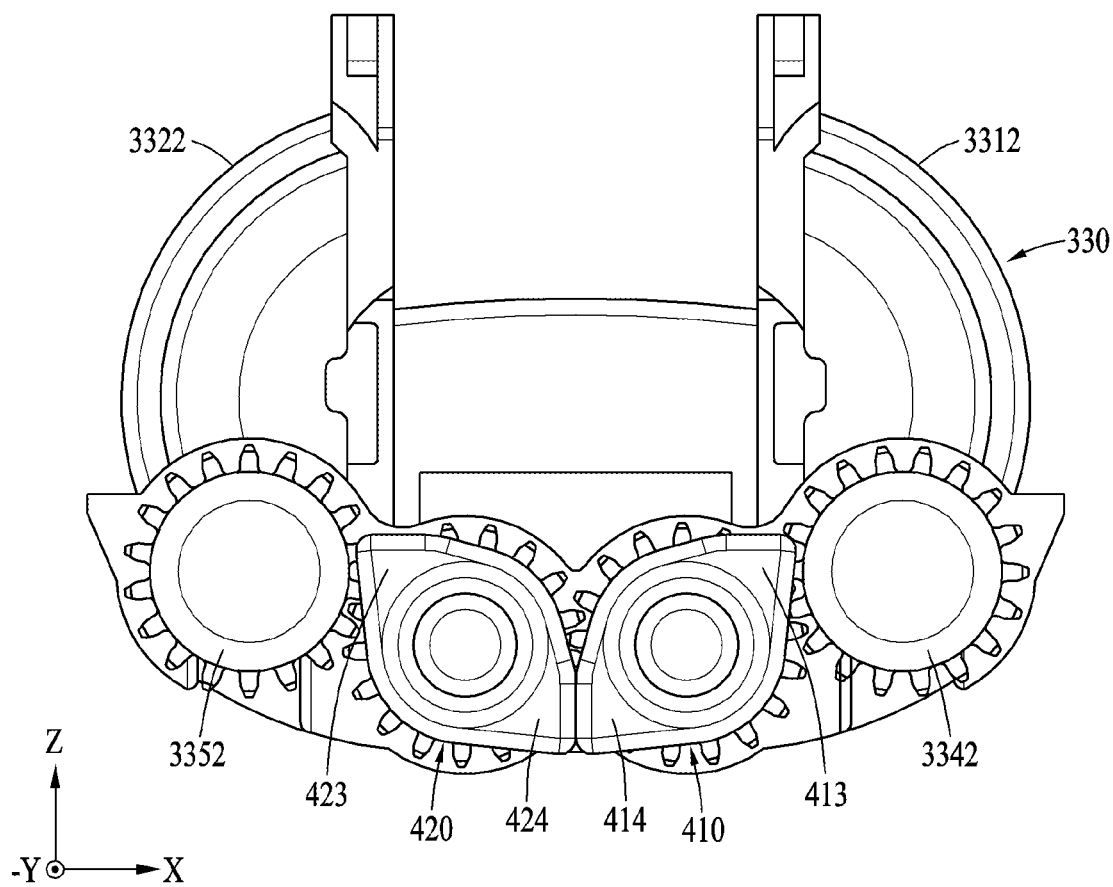
FIG. 6C is a diagram illustrating a hinge assembly in a folded state according to various embodiments.

FIG. 6A is a diagram illustrating the hinge assembly 330 in an unfolded state according to various embodiments, FIG. 6B is a diagram illustrating the hinge assembly 330 in an intermediate state according to various embodiments, and FIG. 6C is a diagram illustrating the hinge assembly 330 in a folded state according to various embodiments. In an example embodiment, the first stopper member 410 may include a third protruding element 414 formed to face the first protruding element 413 based on the first hole 412, and the second stopper member 420 may include a fourth protruding element 424 formed to face the second protruding element 423 based on the second hole 422.

Referring to FIG. 6A, when the hinge assembly 330 according to an example embodiment is in an unfolding state, the first protruding element 413 and the second protruding element 423 are in contact with each other and a counterclockwise rotation of the first idle gear shaft 3364 and a clockwise rotation of the second idle gear shaft 3374 are prevented/reduced. Therefore, a clockwise rotation of the first gear 3342 and a counterclockwise rotation of the second gear 3352 may be prevented/reduced. Here, the first rotator 3312 and the second rotator 3322 may maintain an angle of substantially 180 degrees.

Referring to FIG. 6B, in response to the hinge assembly 330 according to an example embodiment changing from an unfolding state to a folding state, the first rotator 3312 and the second rotator 3322 may change from an angle of 180 degrees to an angle between 180 degrees and 0 degrees. Here, the first stopper member 410 and the second stopper member 420 do not come into contact with each other and lie in an unconstrained state.

Referring to FIG. 6C, when the hinge assembly 330 according to an example embodiment is in a folding state, the first rotator 3312 rotates substantially 90 degrees counterclockwise from an unfolding state and the second rotator 3322 rotates substantially 90 degrees clockwise from the unfolding state and the first rotator 3312 and the second rotator 3322 come into a substantially parallel state accordingly. Here, the third protruding element 414 of the first stopper member 410 and the fourth protruding element 424 of the second stopper member 420 may come into a contact with each other, such that excessive folding of the first rotator 3312 and the second rotator 3322 may be prevented and/or reduced.

In an example embodiment, an angle formed by the first protruding element 413 and the third protruding element 414 may be set based on a gear ratio of the first gear 3342 and the first idle gear 3362. For example, if the gear ratio of the first gear 3342 and the first idle gear 3362 is 1:1, the first protruding element 413 and the third protruding element 414 may be symmetrically provided based on the first hole 412 to form an angle of 180 degrees. For example, if the gear ratio of the first gear 3342 and the first idle gear 3362 is 1:1.5, the first idle gear 3362 may rotate by 60 degrees in response to the first gear 3342 rotating 90 degrees and the first protruding element 413 and the third protruding element 414 may be provided to form an angle of 120 degrees accordingly. Likewise, an angle formed by the second protruding element 423 and the fourth protruding element 424 may be set based on a gear ratio of the second gear 3352 and the second idle gear 3372.

Meanwhile, operation methods according to FIGS. 6A, 6B and 6C are provided as examples only and an electronic device according to various example embodiments described herein is not limited to the operation methods of FIGS. 6A to 6C. For example, when the electronic device includes a stopper member (410, 420) of FIG. 5A, the first stopper member 410 and the second stopper member 420 may be configured to be in contact with each other in one of an unfolding position and a folding position, and, in another one of the unfolding position and the folding position, a stopping position may be maintained through a support force of other parts (e.g., through a support force of the rotator (3312, 3322) and the rotate bracket 333 in FIGS. 4A and 4B).

FIGS. 7A, 7B, 7C and 7D are perspective views illustrating various example stopper members according to various embodiments.

Figure 7A:
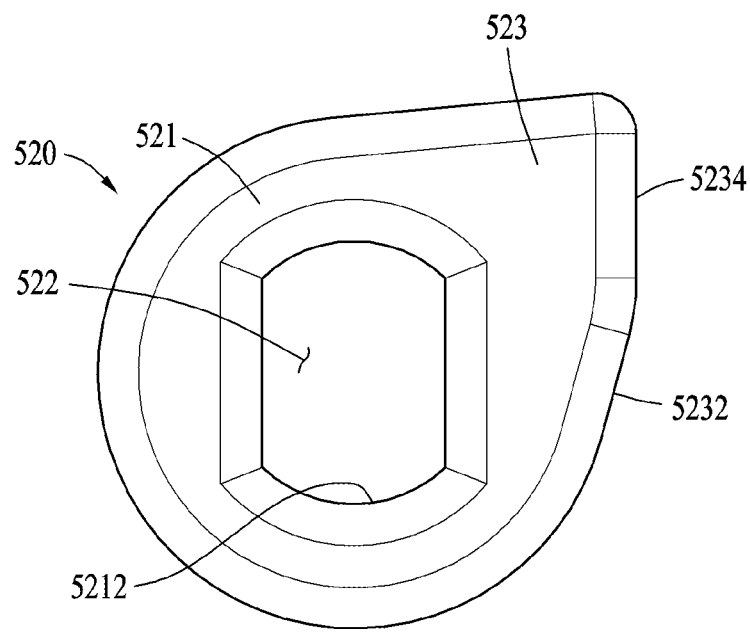
FIG. 7A is a diagram illustrating a stopper and a shape of a hole according to various embodiments.

Referring to FIG. 7A, a second stopper member 520 may include a second body 521 in a cylindrical shape, a second hole 522 formed at the center of the second body 521, a second protruding element 523 configured to protrude from the second body 521, and a second press-fitting protrusion 5212 configured to protrude inward of the second hole 522, and the second protruding element 523 may include a second curved section 5232 formed extending from the outside of the second body 521 and a second planar section 5234 formed from the second curved section 5232 to an end of the second protruding element 523. At least a portion of the second hole 522 may have a straight portion and, desirably, may have a plurality of straight portions parallel to each other. For example, at least a portion of a cross section of the second hole 522 may be in a D shape.

Figure 7B:
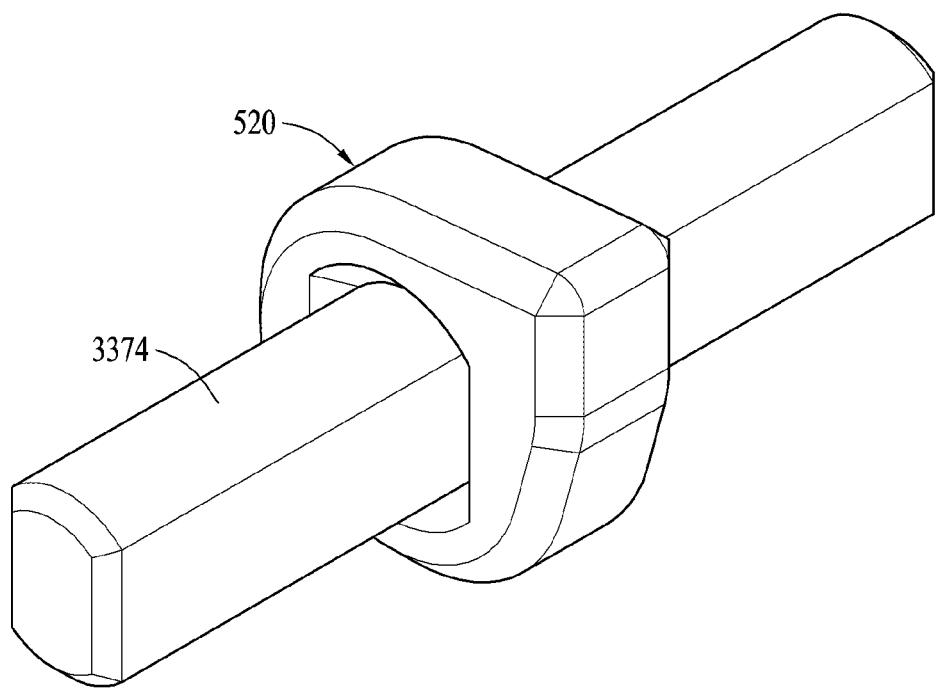
FIG. 7B is a perspective view illustrating the stopper of FIG. 7A coupled to a second idle gear shaft according to various embodiments.

Referring to FIG. 7B, the second idle gear shaft 3374 may have a cross-sectional shape corresponding to that of the second hole 522 and, through this, the second stopper member 520 may be press-fitted and coupled to the second idle gear shaft 3374. Since each of at least a portion of the second hole 522 and at least a portion of a cross section of the second idle gear shaft 3374 has a D shape, a binding force of the second stopper member 420 and the second idle gear shaft 3374 may be reinforced. Also, through press-fitting and coupling of the second stopper member 520 and the second idle gear shaft 3374 by the second press-fitting protrusion 5212, simplification of an assembly process may be promoted.

Figure 7C:
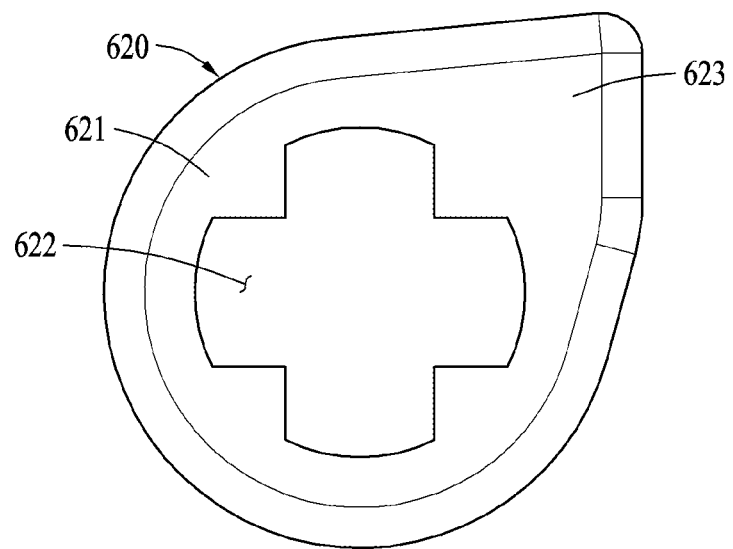
FIGS. 7C and 7D are diagrams illustrating a stopper and a shape of a hole according to various embodiments.

Referring to FIG. 7C, a second stopper member 620 may include a second body 621 in a cylindrical shape, a second hole 622 formed at the center of the second body 621, and a second protruding element 623 configured to protrude from the second body 621. A cross section of second hole 622 may be in a cross shape and a shaft (e.g., the second idle gear shaft 3374 of FIG. 7B) into which the second stopper member 620 inserts may have a cross-shaped cross section corresponding thereto. Since the cross-shaped cross section of the second hole 622 includes a plurality of straight portions, a binding force according to assembly of the second stopper member 620 and the shaft may increase and an assembly tolerance may be minimized/reduced. In another example embodiment, the second hole 622 may include ten or more straight portions. For example, the second hole 622 may have a gear-shaped cross section.

Figure 7D:
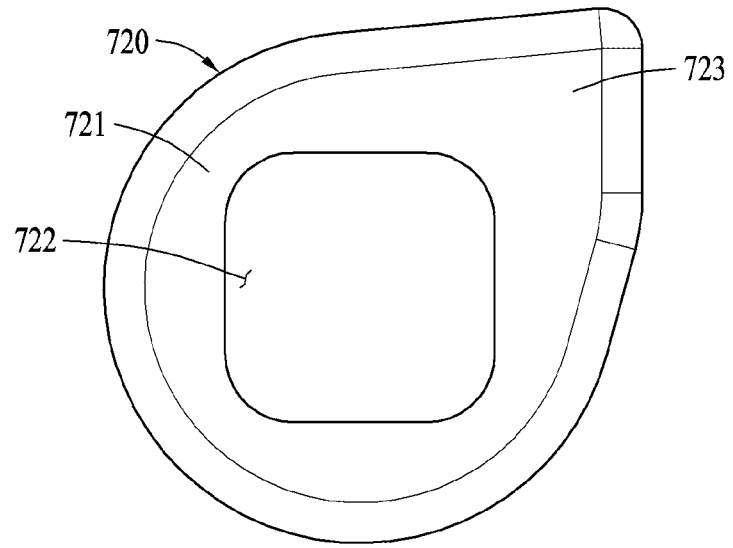

Referring to FIG. 7D, a second stopper member 720 may include a second body 721 in a cylindrical shape, a second hole 722 formed at the center of the second body 721, and a second protruding element 723 formed protruding from the second body 721. A cross section of the second hole 722 may be in a polygonal shape, for example, a rectangular shape. A shaft (e.g., the second idle gear shaft 3374 of FIG. 7B) into which the second stopper member 720 inserts through the second hole 722 may have a rectangular cross section corresponding thereto. Since the rectangular cross section of the second hole 722 includes four straight portions, the second stopper member 720 may have a stronger binding force than that of the second stopper member 520 of FIG. 7A that includes two straight portions and may achieve easier processing than the second stopper member 620 of FIG. 7C that includes eight straight portions.

Figure 8A:
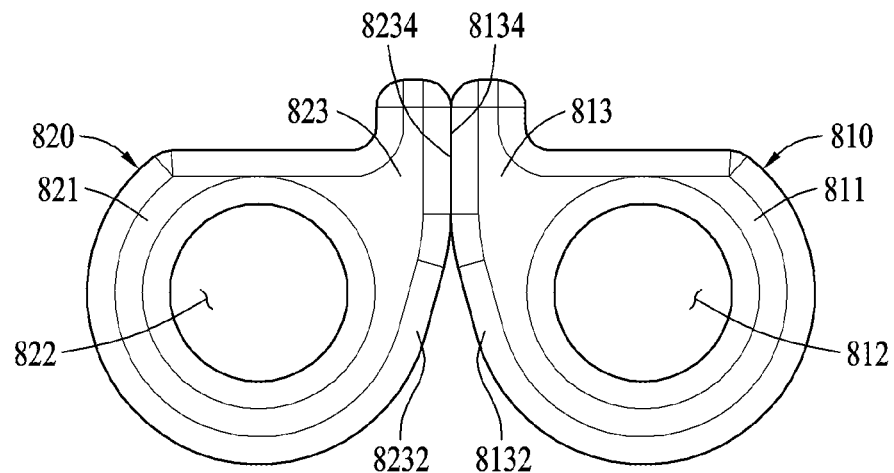
FIGS. 8A and 8B are diagrams illustrating a stopper and a shape of a protrusion according to various embodiments.
Figure 8B:
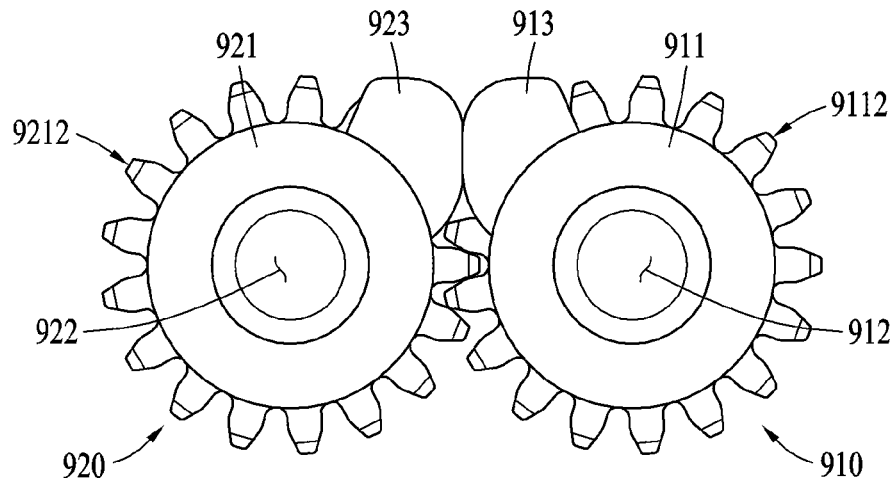

FIGS. 8A and 8B are diagrams illustrating various example stopper members according to various embodiments.

Referring to FIG. 8A, a first stopper member 810 may include a first body 811 in a cylindrical shape, a first hole 812 formed at the center of the first body 811, and a first protruding element 813 formed protruding from the first body 811, and the first protruding element 813 may include a first curved section 8132 formed extending from the outside of the first body 811 and a first planar section 8134 formed from the first curved section 8132 to an end of the first protruding element 813. Here, an area of the first curved section 8132 may be greater than an area of the first planar section 8134. Likewise, the second stopper member 820 may include a second body 821 in a cylindrical shape, a second hole 822 formed at the center of the second body 821, and a second protruding element 823 formed protruding from the second body 821, and the second protruding element 823 may include a second curved section 8232 formed extending from the outside of the second body 821 and a second planar section 8234 formed from the second curved section 8232 to the second protruding element 823. Here, an area of the second curved section 8232 may be greater than that of the second planar section 8234. Therefore, the first planar section 8134 and the second planar section 8234 may have a relatively wide contact area and, due to the wide contact area, the first stopper member 810 and the second stopper member 820 may secure a sufficient support force. Here, it is preferable for the first planar section 8134 or the second planar section 8234 to have a length that does not come into contact with a display (e.g., the display 361 of FIG. 3A).

Referring to FIG. 8B, a first stopper member 910 may include a first body 911 in a cylindrical shape, a first hole 912 formed at the center of the first body 911, and a first protruding element 913 formed protruding from the first body 911, and a first set of teeth 9112 may be formed at the outside of the first body 911. A second stopper member 920 may include a second body 921 in a cylindrical shape, a second hole 922 formed at the center of the second body 921, and a second protruding element 923 formed protruding from the second body 921, and a second set of teeth 9212 may be formed at the outside of the second body 921. The first set of teeth 9112 and the second set of teeth 9212 may be engaged with each other using a gear engagement method and, through this, an amount of rotation of the first body 911 and the second body 921 may be constrained. For example, when a tolerance occurs between the first hole 912 and a shaft (e.g., the first idle gear shaft 3364 of FIG. 4B), a rotational tolerance may occur in the first stopper member 910. Here, since the first body 911 and the second body 921 are constrained to each other through the first set of teeth 9112 and the second set of teeth 9212, both may simultaneously rotate even though an external force initially applies to one of the first stopper member 910 and the second stopper member 920. Also, in an opposite case, both may be simultaneously suspended. Through this, a function of more accurately stopping the first stopper member 910 and the second stopper member 920 may be implemented.

Meanwhile, the first stopper member 910 and the second stopper member 920 according to FIG. 8B may also perform a functionality of an idle gear. For example, the electronic device may include the first stopper member 910 as an idle gear connected to a first gear (e.g., the first gear 3342 of FIG. 4A) and may include the second stopper member 920 as an idle gear connected to a second gear (e.g., the second gear 3352 of FIG. 4A). The first stopper member 910 and the second stopper member 920 may rotate in opposite directions in contact with each other and an amount of rotation of a first gear shaft (e.g., the first gear shaft 3344 of FIG. 4A) and a second gear shaft (e.g., the second gear shaft 3354 of FIG. 4A) may be adjusted to be the same. Positions of the first gear shaft and the second gear shaft may be firmly maintained at an unfolding position or a folding position at which the first protruding element 913 and the second protruding element 923 are in contact.

An example electronic device 301 according to various embodiments may include: a display including a first area and a second area, the first housing positioned in the first area, the second housing positioned in the second area, a hinge assembly including a hinge foldably connecting the first housing and the second housing based on a folding axis, and configured to operate between a folding position at which the first area and the second area face each other and an unfolding position at which the first area and the second area form a substantially same plane, and a stopper connected to the hinge assembly and configured to limit a movement of the first housing and the second housing based on the first housing and the second housing being at a rest angle. The stopper may include a first stopper positioned in the first housing and a second stopper positioned in the second housing. The first stopper and the second stopper may contact each other at the rest angle and the movement of the first housing and the second housing may be limited.

In various example embodiments, the first stopper may be configured to rotate based on a first axis of rotation, the second stopper may be configured to rotate based on a second axis of rotation, and the first axis of rotation and the second axis of rotation may be spaced apart at a same distance from the folding axis.

In various example embodiments, the first stopper and the second stopper may have a non-circular cross-sectional shape symmetrical to each other with respect to a folding surface through which the folding axis passes.

In various example embodiments, the first stopper may include a first body having a cylindrical shape, a first hole formed at the center of the first body, and the first protrusion protruding from the first body. The second stopper may include a second body having a cylindrical shape, a second hole formed at the center of the second body, and a second protrusion protruding from the second body. The first stopper may further include a third protrusion facing the first protrusion based on the first hole. The second stopper may further include a fourth protrusion formed to face the second protrusion based on the second hole. In various example embodiments, the first protrusion may include a first curved section formed from the first body and a first planar section formed from the first curved section to an end. The second protrusion may include the second curved section formed from the second body and a second planar section formed from the second curved section to an end. Based on the first housing and the second housing being at the rest angle, the first planar section and the second planar section may be in contact with a folding surface through which the folding axis passes.

In various example embodiments, a first set of teeth may be formed at an outside of the first body, and a second set of teeth may be formed at an outside of the second body, wherein the first set of teeth and the second set of teeth may be engaged with each other and an amount of rotation of the first body and the second body may be constrained.

In various example embodiments, at least a portion of the first hole and the second hole may include a straight portion.

In various example embodiments, the rest angle may be an angle formed between the first housing and the second housing at one of the unfolding position and the folding position.

In various example embodiments, a hinge assembly may include: a first rotator to which the first housing is fastened and in which a first area of the display is positioned, the second rotator to which the second housing is fastened and in which a second area of the display is positioned, a first gear shaft positioned on one side of the first rotator and configured to rotate with the first rotator, a second gear shaft positioned on one side of the second rotator, configured to rotate with the second rotator, and spaced apart at a same distance as the first gear shaft from a folding axis, a first gear inserted into and configured to rotate with the first gear shaft, a second gear inserted into and configured to rotate with the second gear shaft, the first idle gear shaft into which the first idle gear contacting the first gear is inserted and configured to rotate, and a second idle gear shaft into which the second idle gear contacting the second gear is inserted and configured to rotate. The first idle gear and the second idle gear may be configured to rotate in opposite directions in contact with each other, a first stopper into which the first idle gear shaft is inserted and configured to rotate, and a second stopper into which the second idle gear shaft is inserted and configured to rotate.

In various example embodiments, the hinge assembly may further include a limit bracket configured to constrain the first idle gear shaft and the second idle gear shaft. The first stopper may be positioned between the limit bracket and the first idle gear, and the second stopper may be positioned between the limit bracket and the second idle gear.

In various example embodiments, the first stopper may be press-fitted and coupled to the first idle gear shaft, and the second stopper may be press-fitted and coupled to the second idle gear shaft.

The hinge assembly according to various example embodiments may include: a rotate bracket, the first gear shaft rotatably inserted into and coupled to the first side of the rotate bracket and into which the first gear is inserted and configured to rotate, the second gear shaft rotatably inserted into and coupled to the second side of the rotate bracket into which the second gear is inserted and configured to rotate, and spaced apart at a same distance as the first gear shaft from the folding axis, the first idle gear shaft rotatably inserted into and coupled to the first side of the rotate bracket and into which the first idle gear contacting the first gear is inserted and configured to rotate, the second idle gear shaft rotatably inserted into and coupled to the second side of the rotate bracket, into which the second idle gear contacting the second gear is inserted and configured to rotate, and spaced apart at a same distance as the first idle gear shaft from the folding axis, the first stopper into which the first idle gear shaft is inserted and configured to rotate, and the second stopper into which the second idle gear shaft is inserted and configured to rotate. The first idle gear and the second idle gear may be configured to rotate in opposite directions in contact with each other, the first stopper may include the first body, the first hole formed at the center of the first body and into which the first idle gear shaft is inserted, and the first protrusion protruding from the first body, and the second stopper may include the second body, the second hole formed at the center of the second body into which the second idle gear shaft is inserted and configured to rotate, and the second protrusion protruding from the second body.

In various example embodiments, a sum of a distance from the center of the first hole to the outside of the first body and a distance from the center of the second hole to the outside of the second body may be less than a distance between the first hole and the second hole. A sum of a distance from the center of the first hole to the end of the first protrusion and a distance from the center of the second hole to the end of the second protrusion may be greater than the distance between the first hole and the second hole.

In various example embodiments, a cross section of the first idle gear shaft may have a shape corresponding to a cross section of the first hole, or a cross section of the second idle gear shaft may have a shape corresponding to a cross section of the second hole.

In various example embodiments, the first stopper may include a first press-fitting protrusion protruding inward of the first hole configured to press-fit and couple to the first idle gear shaft, or the second stopper may include a second press-fitting protrusion protruding inward of the second hole configured to press-fit and couple to the second idle gear shaft. In various example embodiments, a cross section of the first hole or a cross section of the second hole may have at least one of a D shape, a cross shape, a polygonal shape, and a gear shape.

In various example embodiments, the first stopper may further include the third protrusion facing the first protrusion based on the first hole, the second stopper may further include the fourth protrusion facing the second protrusion based on the second hole, a placement angle between the first protruding element and the third protrusion may be set based on a gear ratio of the first gear and the first idle gear, and a placement angle between the second protruding element and the fourth protrusion may be set based on a gear ratio of the second gear and the second idle gear.

The electronic device according to various example embodiments may include: a display including a first area and a second area, a first housing positioned in the first area, a second housing positioned in the second area, and a hinge assembly including a hinge configured to foldably connect the first housing and the second housing based on a folding axis, and to operate between a folding position at which the first area and the second area face each other and an unfolding position at which the first area and the second area form a substantially same plane. The hinge assembly may include the rotate bracket having a first side connected to the first housing and a second side connected to the second housing, a first gear shaft rotatably inserted into and coupled to the first side of the rotate bracket and into which the first gear is inserted and configured to rotate, a second gear shaft rotatably inserted into and coupled to the second side of the rotate bracket, into which the second gear is inserted and configured to rotate, and spaced apart at a same distance as the first gear shaft from the folding axis, a first idle gear shaft rotatably inserted into and coupled to the first side of the rotate bracket and into which the first idle gear connected to the first gear is inserted and configured to rotate, a second idle gear shaft rotatably inserted into and coupled to the second side of the rotate bracket, into which the second idle gear connected to the second gear is inserted and configured to rotate, and spaced apart at a same distance as the first idle gear shaft from the folding axis, a first stopper into which the first idle gear shaft is inserted and configured to rotate, and a second stopper into which the second idle gear shaft is inserted and configured to rotate, the first idle gear and the second idle gear may be configured to rotate in opposite directions in contact with each other, the first stopper may include a first body, a first hole formed at the center of the first body and into which the first idle gear shaft is inserted, and a first protrusion protruding from the first body, a second stopper may include a second body, a second hole formed at the center of the second body into which the second idle gear shaft is inserted and configured to rotate, and the second protrusion protruding from the second body, a sum of a distance from the center of the first hole to the outside of the first body and a distance from the center of the second hole to the outside of the second body may be less than a distance between the first hole and the second hole, and a sum of a distance from the center of the first hole to the end of the first protrusion and a distance from the center of the second hole to the end of the second protrusion may be greater than the distance between the first hole and the second hole.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display comprising a first area and a second area;
    a first housing positioned in the first area;
    a second housing positioned in the second area;
    a hinge assembly including a hinge foldably connecting the first housing and the second housing based on a folding axis, and configured to operate between a folding position at which the first area and the second area face each other and an unfolding position at which the first area and the second area form a substantially same plane; and
    a stopper connected to the hinge assembly and configured to limit a movement of the first housing and the second housing based on the first housing and the second housing being at a rest angle,
    wherein the stopper comprises:
    a first stopper positioned in the first housing; and
    a second stopper positioned in the second housing,
    wherein the first stopper comprises a first body and a first protrusion protruding from the first body, and
    the second stopper comprises a second body and a second protrusion protruding from the second body,
    wherein the first protrusion and the second protrusion contact with each other at the rest angle and the contact of the first protrusion and the second protrusion limits the movement of the first housing and the second housing.

2. The electronic device of claim 1, wherein the first stopper is configured to rotate based on a first axis of rotation, the second stopper is configured to rotate based on a second axis of rotation, and the first axis of rotation and the second axis of rotation are spaced apart at a same distance from the folding axis.

3. The electronic device of claim 1, wherein the first stopper and the second stopper have a non-circular cross-sectional shape symmetrical to each other with respect to a folding surface through which the folding axis passes.

4. The electronic device of claim 1, wherein the first body has a cylindrical shape and a first hole formed at the center of the first body, and
    the second stopper the second body has a cylindrical shape, and a second hole formed at the center of the second body.

5. The electronic device of claim 4, wherein a first set of teeth is formed at an outside of the first body and a second set of teeth is formed at an outside of the second body, and
    the first set of teeth and the second set of teeth are configured to be engaged with each other and an amount of rotation of the first body and the second body is constrained.

6. The electronic device of claim 4, wherein at least a portion of the first hole has a straight portion and a portion of the second hole has a straight portion.

7. The electronic device of claim 1, wherein the first stopper further comprises a third protrusion facing the first protrusion based on the first hole, and
    the second stopper further comprises a fourth protrusion facing the second protrusion based on the second hole.

8. The electronic device of claim 1, wherein the first protrusion comprises a first curved section formed from the first body and a first planar section formed from the first curved section to an end, and the second protrusion comprises a second curved section formed from the second body and a second planar section formed from the second curved section to an end.

9. The electronic device of claim 8, wherein, based on the first housing and the second housing being at the rest angle, the first planar section and the second planar section are in contact with a folding surface through which the folding axis passes.

10. The electronic device of claim 1, wherein the rest angle is an angle formed between the first housing and the second housing at one of the unfolding position and the folding position.

11. The electronic device of claim 1, wherein the hinge assembly comprises:
a first rotator to which the first housing is fastened and in which the first area of the display is positioned;
a second rotator to which the second housing is fastened and in which the second area of the display is positioned;
a first gear shaft positioned on one side of the first rotator and configured to rotate with the first rotator;
a second gear shaft positioned on one side of the second rotator, configured to rotate with the second rotator, and spaced apart at a same distance as the first gear shaft from the folding axis;
a first gear inserted into and configured to rotate with the first gear shaft;
a second gear inserted into and configured to rotate with the second gear shaft;
a first idle gear shaft into which a first idle gear contacting the first gear is inserted and configured to rotate; and
a second idle gear shaft into which a second idle gear contacting the second gear is inserted and configured to rotate,
wherein the first idle gear and the second idle gear are configured to rotate in opposite directions and in contact with each other,
the first stopper into which the first idle gear shaft is inserted and configured to rotate, and the second stopper into which the second idle gear shaft is inserted and configured to rotate.

12. The electronic device of claim 11, wherein the hinge assembly further comprises: a limit bracket configured to constrain the first idle gear shaft and the second idle gear shaft, and
the first stopper is positioned between the limit bracket and the first idle gear, and the second stopper is positioned between the limit bracket and the second idle gear.

13. The electronic device of claim 11, wherein the first stopper is configured to be press-fit and coupled to the first idle gear shaft, and the second stopper is configured to be press-fit and coupled to the second idle gear shaft.

14. A hinge assembly comprising:
a rotate bracket;
a first gear shaft rotatably inserted into and coupled to a first side of the rotate bracket into which a first gear is inserted and configured to rotate;
a second gear shaft rotatably inserted into and coupled to a second side of the rotate bracket, into which a second gear is inserted and configured to rotate, and spaced apart at a same distance as the first gear shaft from a folding axis;
a first idle gear shaft rotatably inserted into and coupled to the first side of the rotate bracket and into which a first idle gear contacting the first gear is inserted and configured to rotate;
a second idle gear shaft rotatably inserted into and coupled to the second side of the rotate bracket, into which a second idle gear contacting the second gear is inserted and configured to rotate, and spaced apart at a same distance as the first idle gear shaft from the folding axis;
a first stopper into and the first idle gear shaft is inserted and configured to rotate; and
a second stopper into which the second idle gear shaft is inserted and configured to rotate,
wherein the first idle gear and the second idle gear rotate in opposite directions in contact with each other,
the first stopper comprises a first body, a first hole formed at the center of the first body and into which the first idle gear shaft is inserted, and a first protrusion protruding from the first body, and
the second stopper comprises a second body, a second hole formed at the center of the second body and into which the second idle gear shaft is inserted, and a second protrusion protruding from the second body.

15. The hinge assembly of claim 14, wherein a sum of a distance from a center of the first hole to an outside of the first body and a distance from a center of the second hole to an outside of the second body is less than a distance between the first hole and the second hole, and
a sum of a distance from the center of the first hole to an end of the first protrusion and a distance from the center of the second hole to an end of the second protrusion is greater than the distance between the first hole and the second hole.

16. The hinge assembly of claim 14, wherein a cross section of the first idle gear shaft has a shape corresponding to a cross section of the first hole, and/or a cross section of the second idle gear shaft has a shape corresponding to a cross section of the second hole.

17. The hinge assembly of claim 16, wherein the first stopper comprises a first press-fitting protrusion protruding inward of the first hole and configured to press-fit and couple to the first idle gear shaft, and/or the second stopper comprises a second press-fitting protrusion protruding inward of the second hole and configured to press-fit and couple to the second idle gear shaft.

18. The hinge assembly of claim 16, wherein a cross section of the first hole or a cross section of the second hole has at least one of a D shape, a cross shape, a polygonal shape, and a gear shape.

19. The hinge assembly of claim 14, wherein the first stopper member further comprises a third protrusion formed to face the first protrusion based on the first hole,
the second stopper further comprises a fourth protrusion formed to face the second protrusion based on the second hole,
a placement angle between the first protrusion and the third protrusion is set based on a gear ratio of the first gear and the first idle gear, and
a placement angle between the second protrusion and the fourth protrusion is set based on a gear ratio of the second gear and the second idle gear.

20. An electronic device comprising:
a display comprising a first area and a second area;
a first housing positioned in the first area;
a second housing positioned in the second area; and a hinge assembly including a hinge foldably connecting the first housing and the second housing based on a folding axis, and configured to operate between a folding position at which the first area and the second area face each other and an unfolding position at which the first area and the second area form the substantially same plane, wherein the hinge assembly comprises:

a rotate bracket having a first side connected to the first housing and a second side connected to the second housing;

a first gear shaft rotatably inserted into and coupled to the first side of the rotate bracket and into which a first gear is inserted and configured to rotate;

a second gear shaft rotatably inserted into and coupled to the second side of the rotate bracket, into which a second gear is inserted and configured to rotate, and spaced apart at a same distance as the first gear shaft from the folding axis;

a first idle gear shaft rotatably inserted into and coupled to the first side of the rotate bracket and into which a first idle gear connected to the first gear is inserted and configured to rotate;

a second idle gear shaft rotatably inserted into and coupled to the second side of the rotate bracket, into which a second idle gear connected to the second gear is inserted and configured to rotate, and spaced apart at a same distance as the first idle gear shaft from the folding axis;

a first stopper into which the first idle gear shaft is inserted and configured to rotate; and a second stopper into which the second idle gear shaft is inserted and configured to rotate, the first idle gear and the second idle gear are configured to rotate in opposite directions in contact with each other, the first stopper comprises a first body, a first hole formed at the center of the first body and into which the first idle gear shaft is inserted, and a first protrusion protruding from the first body, the second stopper comprises a second body, a second hole formed at the center of the second body into which the second idle gear shaft is inserted, and a second protrusion protruding from the second body, a sum of a distance from a center of the first hole to an outside of the first body and a distance from a center of the second hole to an outside of the second body is less than a distance between the first hole and the second hole, and a sum of a distance from the center of the first hole to an end of the first protrusion and a distance from the center of the second hole to an end of the second protrusion is greater than the distance between the first hole and the second hole.

* * * * *